United States Patent
Reid et al.

(10) Patent No.: US 10,567,072 B2
(45) Date of Patent: Feb. 18, 2020

(54) SATELLITE COMMUNICATIONS SUBSYSTEM IN-ORBIT VERIFICATION SYSTEM AND METHODOLOGIES

(71) Applicant: TELESAT CANADA, Ottawa (CA)

(72) Inventors: Stephen Reid, Ottawa (CA); Roger Yip, Ottawa (CA)

(73) Assignee: TELESAT CANADA, Ottawa, ON (CA)

( * ) Notice: Subject to any disclaimer, the term of this patent is extended or adjusted under 35 U.S.C. 154(b) by 0 days.

(21) Appl. No.: 15/779,405

(22) PCT Filed: Nov. 28, 2016

(86) PCT No.: PCT/CA2016/051397
§ 371 (c)(1),
(2) Date: May 25, 2018

(87) PCT Pub. No.: WO2017/088067
PCT Pub. Date: Jun. 1, 2017

(65) Prior Publication Data
US 2018/0309506 A1 Oct. 25, 2018

(30) Foreign Application Priority Data
Nov. 27, 2015 (CA) .................................. 2913564

(51) Int. Cl.
*H04B 17/21* (2015.01)
*H04B 7/185* (2006.01)
(Continued)

(52) U.S. Cl.
CPC ....... *H04B 7/18519* (2013.01); *H04B 7/1858* (2013.01); *H04B 7/18515* (2013.01);
(Continued)

(58) Field of Classification Search
CPC ........ H04B 17/21; H04B 17/40; H04B 7/185; H04B 7/18515; H04B 7/18519; H04B 7/1858; H04B 7/18597
See application file for complete search history.

(56) References Cited

U.S. PATENT DOCUMENTS 6,757,858 B1 6/2004 Flammang
2003/0017827 A1* 1/2003 Ciaburro ............ H04B 7/18519
455/427

(Continued)

FOREIGN PATENT DOCUMENTS

EP   1 083 682       3/2001
EP   1083682 A2 *   3/2001  ......... H04B 7/18519

OTHER PUBLICATIONS

Kennewell, Solar radio interference to satellite downlinks, 1989 (Year: 1989).*
PCT Search report issued in PCT/CA2016/051397.

*Primary Examiner* — Dong-Chang Shiue
(74) *Attorney, Agent, or Firm* — Greenblum & Bernstein, P.L.C.

(57) ABSTRACT

The present invention relates to satellite systems and more particularly, to the provision of novel systems and methods for verifying the in-orbit performance and operation of satellite communications subsystems. In contrast to traditional Payload IOT (in-orbit test), the invention operates without an uplink signal, by generating hardware-specific signatures using isolated, internally generated, thermal noise. It has been found that this noise provides a very stable, repeatable signal for testing. Prior to launch, a repeater command sequence is executed to generate a hardware-specific signature based on the internally-generated noise. The same repeater command sequence is then executed in-orbit to determine whether the hardware-specific signature has changed. The two signatures may be (Continued)

recorded and compared using a simple tool such as a spectrum analyzer. The methods also include novel use of the sun as a test signal source to calibrate equipment, to quantify atmospheric effects and to be used as an intermediate reference power level during measurements.

22 Claims, 27 Drawing Sheets

(51) Int. Cl.
  *H04B 17/40* (2015.01)
  *H04B 17/12* (2015.01)
(52) U.S. Cl.
  CPC ......... *H04B 7/18597* (2013.01); *H04B 17/40* (2015.01); *H04B 17/12* (2015.01)

(56) References Cited

U.S. PATENT DOCUMENTS

| | | | |
|---|---|---|---|
| 2010/0232351 A1* | 9/2010 | Chansarkar | G01S 19/13 370/320 |
| 2014/0073239 A1* | 3/2014 | Tessandori | H04B 7/18519 455/9 |
| 2016/0248462 A1* | 8/2016 | Danilenko | H04B 1/12 |
| 2017/0134103 A1* | 5/2017 | Tessandori | H04B 7/18515 |

* cited by examiner

| A1 | 10 MHz DIST. AMP | |
|---|---|---|
| A3 | DBS TX PWR MTR | Ku TX PWR MTR |
| A6 | C TX PWR MTR | |
| A9 A10 | DBS TX MAC | |
| A13 | Ku TX MAC | |
| A17 | C TX MAC | |
| A21 | SPEC. AN,1 | |
| A26 | SPEC. ANAL 1 I/F ANL | |
| A27 | TRANSMIT SYNTH 1 | |
| A30 | TX SYNTH SWITCHER UNIT | |
| A32 | TRANSMIT SYNTH 2 | |

| A1 | DBS TLT CONTROLLER | |
|---|---|---|
| A3 | Ku TLT CONTROLLER | |
| A5 | C TLT CONTROLLER | |
| A8 | Ku RX PWR MTR | C RX PWR MTR |
| A11 | Ku DBS RX MAC | |
| A14 | C RX MAC | |
| A17 | SPEC.AN,2 | |
| A26 | SPEC. AN. 2 I/P SWITCHER | |
| A28 | RX INJECT SYNTHESIZER | |
| A32 | Ku DOWNCONVERTER | |
| A34 | HP 8 SWITCH CONTROL UNIT | |
| A37 | Ku UP CONVERTER | |

FIGURE 1C

SATELLITE COMMUNICATIONS SUBSYSTEM IN-ORBIT VERIFICATION SYSTEM AND METHODOLOGIES

FIELD OF INVENTION

The present invention relates to satellite systems and more particularly, to the provision of novel systems and methods for validating the in-orbit performance, functionality and operation of satellite communications subsystems.

BACKGROUND OF THE INVENTION

After a newly launched satellite has reached its operational orbital altitude, it is necessary to perform a series of comprehensive tests to confirm that all components of the communications subsystem have survived the rigors of launch, and that the initial in-orbit performance is meeting design specification. A regime of such tests is generally referred to as Payload In-Orbit Test or simply Payload IOT. Traditional beginning of life Payload IOT is comprised of a series of dedicated and specific RF measurements. Following successful completion of the Payload IOT campaign, which includes a detailed manual comparison of the measured RF parameters against pre-launch predicts to ensure performance is being met, the satellite is accepted from the manufacturer and is ready to be placed into commercial service. Depending on the complexity of the communications payload design and IOT system capabilities, Payload IOT can typically require many weeks to complete. Once placed into commercial service, Payload IOT measurements may be repeated on an as-required basis should further in-orbit performance evaluation be warranted.

Traditional Payload IOT on increasingly complex payloads is impractical without the existence of sophisticated ground-based test systems and teams of technical experts to oversee their operations and to review all measured data. These systems consist of racks of computer-controlled RF test equipment which interface to specialized calibrated ground antennas (often in multiple geographical regions) to generate conditioned radio frequency (RF) signals. These signals provide the capability to accurately measure the RF parameters that are used to technically assess payload subsystem performance. FIGS. 1A-1C present a block diagram of a typical hardware configuration and RF equipment racks for a Payload IOT ground station transmit (uplink) and receive (downlink) chain. In addition to ground antennas and transmission/reception equipment, such a test system typically requires a complex arrangement of RF signal synthesizers, power meters, signal analysers, phase shifters, phase combiners and controllers on the transmit chain, to generate a known uplink signal, and a similarly complex arrangement of complementary analysis components on the receive chain. While there have been advances in RF test equipment, software automation and network interfacing, the RF measurement techniques have remained relatively unchanged for many decades. Thus today, the standard procedure is to perform a comprehensive set of highly specific measurements, to independently measure key RF performance parameters, whenever there is a requirement to ensure that the satellite communications subsystem in-orbit performance is meeting specification.

The Payload IOT process in use today within the industry has become increasingly complex due to the continued belief that traditional RF measurement methodologies are still warranted to effectively validate the in-orbit performance of complex, multi-purpose satellite communications payloads. Despite further enhancements in Payload IOT system capabilities, there is little to be gained in terms of reducing the time, effort and manpower requirements for planning and conducting a Payload IOT campaign with the continued use of traditional RF measurement methodologies. Therefore, with each passing year, it has become more and more difficult to plan, coordinate, conduct, and complete the technical results review of a Payload IOT campaign within acceptable timeframes that are required to meet, often critical, corporate commercial objectives.

Satellite-related components and resources are very costly. Because of the time and resources required by traditional Payload IOT there is a need for improved systems and methods for validating the in-orbit operation and performance of a satellite's communications subsystem.

SUMMARY OF THE INVENTION

It is an object of the invention to provide an improved, simplified system with novel methodologies for validating the in-orbit operation and performance of a satellite's communication subsystem, which mitigates on the problems described above.

To distinguish the system and method of the invention from the traditional Payload IOT described in the Background of the Invention, the approach described in the body of the application is referred to as Payload In-Orbit Verification (IOV). When compared to traditional Payload In-Orbit Test, Payload In-Orbit Verification offers a novel streamlined approach for validating that the in-orbit performance of a satellite communications repeater, for example, is meeting specification and has not changed since launch. Utilizing pre-defined repeater command sequences completed with the communication subsystem's input isolated from the external environment, IOV produces hardware-specific signatures that are measured using a common set of ground-based RF test equipment to confirm whether in-orbit performance has deviated from a pre-launch baseline. (Note that a "command sequence" or "configuration sequence" is the process of stepping through the various operational states that the satellite payload may have, so that all of the states of interested may be tested: turning various switches off and on, changing the values of gain parameters, etc.) IOV can therefore be considered a "self-diagnostic" test that, in the absence of an active external RF input signal, allows repeater performance to be directly assessed without the need for complex and specialized RF test benches or highly specialized personnel to digest, review and interpret results. In addition, through a technique that uses the Sun as a stable RF reference source, the need for IOT-specific calibrated RF facilities is eliminated. For each IOV configuration sequence the on-board, self-generated, RF transmission signal is recorded using a common piece of ground test equipment, such as a spectrum analyzer, network analyzer or similar RF measurement device, which is configured and operated remotely, without the need for highly specialized personnel. There is no requirement for additional RF test equipment or measurement-specific interfacing to the RF facility. Post-processing of IOV results, including comparison to the pre-launch baseline, is accomplished using automated analysis routines developed specifically for IOV.

Testing of a device under test (DUT) requires input of a stimulus and measurement of a response. In traditional In-Orbit Test (IOT) of a satellite communications payload:
a. the stimulus, called an uplink signal, is transmitted from the ground and is received by the satellite communications payload;

b. the uplink signal is modified by the satellite communications payload and is directed or transmitted back toward the Earth as a downlink signal; and c. the downlink signal (payload response) is received by the ground test equipment and is analyzed to determine and assess the communication payload performance.

The traditional Payload IOT analysis requires accurate knowledge of both the stimulus and response, thus necessitating sophisticated systems that will synchronize and measure calibrated RF uplink and downlink signals simultaneously, often from diverse geographical locations. This analysis is further complicated by the difficulty in removing the effect of extraneous factors such as weather, RF transmission path losses and interference, and un-calibrated ground measurement system components, which also affect the response and affect measurement accuracy.

IOV addresses the above concerns with traditional IOT analysis by:

a. removing the uplink signal. This greatly simplifies the testing by eliminating one complete side of the test equipment and negates the need to synchronize the uplink and downlink measurements;

b. reducing one half of the extraneous factors by removing the uplink uncertainties by isolating the input of the DUT. Isolating the input of the DUT provides a well characterized thermal profile that is used to generate a noise spectrum and power level that allows the measuring of the DUT frequency response, output power and noise figure;

c. providing a complete downlink path calibration through the "sun cal" (Sun calibration) technique described hereinafter; and d. allowing the dynamic range of the signal measurement to be extended by using the additive properties of noise.

Key innovations of IOV include:

a. Replacing Uplink Stimulus: As stated above, all testing requires a stimulus. The properties of the stimulus must be "compatible" with the DUT in that the DUT must be operable to generate an effective and quantifiable noise pedestal as described herein. In traditional Payload IOT, the uplink signal has unique frequency, amplitude, polarization and modulation values that are selected to elicit the desired response from the payload. Payload IOV is entirely different, in that it employs thermal noise which is always present and is well defined according to the noise power formula N=kTB (where N is power density, k is Boltzman's constant, T is temperature in Kelvin, and B is bandwidth in Hertz). The communication payload on the satellite is typically in a temperature controlled environment. So an input load within the satellite will stay at substantially the same temperature, resulting in a stable noise signal. Telemetry data can be obtained on the payload temperature, so either the temperature of the payload can be adjusted if required, or calculations can be done to compensate for the difference between the pre-launch and in-orbit temperatures. Given that the noise is a well defined energy source, IOV uses noise as the stimulus for testing, eliminating the need for an uplink signal. IOV employs the noise generated at the payload input, in other words, the noise is internally generated. This allows the additional test improvement of blocking the input of the payload to exclude any outside influences, and isolating the stimulus to just the thermal noise due to the input section of the payload. Using the internal noise as a stimulus effectively brings the source location from the test facility on the ground to the input of the payload on the satellite, eliminating problems with external factors that cause signal instability, interference and uplink signal measurement uncertainty.

b. Self-Performance Testing: Testing of the payload can be further enhanced by measuring the response of the payload with different settings (for example, gain and operational modes). By adjusting the internal settings of the payload, the performance at different operating points can be obtained without the need for an adjustable external uplink signal. Simultaneous measurement of the transponder response along with telemetry signature (i.e. the on-board measured quantities of the payload hardware) allows a full assessment of the payload as the system is stepped through its operating range using a pre-defined command sequence. Examples of test measurements includes noise figure, frequency response, gain steps, ALC control loop performance, antenna transmit cross-pol performance, transmit antenna patterns, amplifier transmitted EIRP and amplifier telemetry data vs EIRP.

c. Self-diagnostic Capability: Performance assessment in traditional Payload IOT requires an analysis to determine the transformation between uplink signal and downlink signal. As the uplink is inherently unique with each test, each assessment will also be unique, so comparison between various tests will have a degree of uncertainty. In contrast, IOV use of the consistent internal noise significantly reduces the variability and provides for a high level of repeatability. In the IOV methodology, the self-generated input noise signal is constant for most normal operations. As a result the downlink signal should be the same from test to test, allowing for a simplified performance assessment: direct comparison of measured signal steps and shapes between any two tests through the use of automated post-processing techniques. A discrepancy between tests will be an indication of a change in payload performance. The assessment of relative signal steps provides much higher repeatability compared to traditional absolute value measurements.

d. Sun calibration—RF ground station facility: With traditional Payload IOT, the ground station antenna system must be calibrated prior to testing a DUT. Due to its size and complexity, not all parts of the antenna system can be fully calibrated. For instance, the performance of large antennas often can only be calibrated at select frequencies in the field due to the unavailability of external broadband signal sources over the full frequency band. As well, the atmospheric effects are not totally accounted for during Payload IOT tests as there is no direct functionality available to fully remove these effects. The Sun calibration (sun cal) technique described herein, is used to address these two issues. The Sun is a highly stable source of RF energy with well defined and stable energy levels across the RF frequency spectrum as expressed by Planck's Law. As well, the Sun experiences the identical atmospheric effects experienced by a satellite's RF signal, allowing an accurate method to remove weather effects and other atmospheric losses (i.e. the losses between the Sun and a ground station will be the same as those between a satellite and a ground station). Utilizing the Sun as a test source, it is possible to fully characterize and calibrate the performance of any RF test facility by measuring the Sun's frequency spectrum throughout the band of interest. This ability to fully characterize the path from space, through the atmosphere and Earth station to the RF measurement device provides measurement accuracy not previously attainable in the field. This high level of accuracy allows for test measurements that are highly repeatable and easily comparable for performance assessment.

e. Sun calibration—power. A second aspect of Sun calibration is its ability to act as a global reference for power measurements. In traditional Payload IOT, each Earth-based test set is independently calibrated for power measurements against a certified "standard" antenna. This calibration requires that both the test set and the standard measure a remote source, and their measurements are then equated through a calibration factor. The accuracy of the traditional Payload IOT approach is limited by:

i. how well both are aligned to the source, as the source is a relatively small target (typically an existing communications satellite in geosynchronous orbit);
ii. the difference in sensitivity. The standard typically is many orders of magnitude less sensitive than the test set. This large difference generates a large calibration value to account for the sensitivities. Small errors in the standard's measurement can get magnified due to the calibration value, resulting in additional error uncertainties; and
iii. limited test frequencies. The satellites typically provide limited frequencies for test either due to availability or by payload design. As a result, the calibration cannot be continuous across the whole spectrum or may not be at the desired test frequency.

As the Sun is a fixed reference point and is accessible by the Earth based test facilities, the Sun's power can be used as a common calibration level to ensure all test sites have a consistent power measurement. The use of the Sun as a reference overcomes the above problems with traditional Payload IOT because:

i. the Sun is a much larger target than a satellite, and its position is well known so it is easier to find and point accurately;
ii. a calibrated standard is not required. The Sun's energy is equated directly with the known performance of an existing source such as a prior tested satellite payload;
iii. the Earth facilities are all of similar size so there is significantly less error magnification when calibrating between test sets; and
iv. the Sun generates an RF signal across the full spectrum with a well defined energy distribution according to Planck's Law. By calibrating any single point on the spectrum, the calibration for the whole spectrum can be determined.

In one embodiment of the invention there is provided a method of satellite in-orbit payload verification comprising: following launch of the satellite, at the satellite: configuring operating parameters of the payload to a specific state, the state including a payload input being configured to an RF termination or off-line, resulting in a thermal noise signal being self-generated by the payload of the satellite; and processing and transmitting the thermal noise signal from the satellite to a ground station. And at the ground station: receiving the transmitted thermal noise signal; and comparing the received thermal noise signal to baseline data for the same payload state, to determine whether the performance and functionality of the communication payload has changed.

In another embodiment of the invention there is provided a satellite system comprising: a satellite in orbit; and a ground station. The satellite is operable to: configure the operating parameters of the payload to a specific state, the state including the payload input being configured to an RF termination or off-line, resulting in a thermal noise signal being self-generated by the payload of the satellite; and process and transmit the thermal noise signal from the satellite to the ground station. The ground station is operable to: receive the transmitted thermal noise signal; and compare the received thermal noise signal to baseline data for the same payload state, to determine whether the performance and functionality of the communication payload has changed.

In an additional embodiment of the invention there is provided a satellite communication payload comprising: means for configuring the operating parameters of the communication payload to a specific state, the specific state including a payload input being configured to an RF termination or off-line, resulting in a thermal noise signal being self-generated by the communication payload; and means for processing and transmitting the thermal noise signal to a ground station.

Other aspects and features of the present invention will be apparent to those of ordinary skill in the art from a review of the following detailed description when considered in conjunction with the drawings.

BRIEF DESCRIPTION OF THE DRAWINGS

These and other features of the invention will become more apparent from the following description in which reference is made to the appended drawings wherein:

FIGS. 1A-1C present block diagrams exemplifying a typical hardware configuration and RF equipment racks for an IOT ground station transmit (uplink) and receive (downlink) chain, as known in the prior art. Specifically, FIG. 1A presents a block diagram for an exemplary IOT uplink chain, while FIG. 1B presents a block diagram for an exemplary IOT downlink chain.

Similar reference numerals have been used in different figures to denote similar components.

DETAILED DESCRIPTION

As explained briefly above, there are many challenges that can impact both the planning and execution of a traditional Payload IOT. These challenges are exacerbated by the ever increasing complexity of the design and capabilities of onboard communications payloads, combined with the restrictions placed on coordinating where and when Payload IOT can take place so as to minimize RF and, in some cases physical, interference with neighbouring satellites. This, when combined with the highly specialized requirement for using ground facilities that are IOT-capable, will continue to increase the effort and cost associated with planning and conducting a traditional Payload IOT campaign. Listed below are examples of some of the challenges associated with planning and conducting a Payload IOT campaign. Included in each example are the benefits that the system and method of the IOV invention can offer:

1. Specialized RF Ground Facilities

The highly specialized RF ground facilities required to support traditional Payload IOT are in limited supply globally. As a result it can be extremely difficult to locate and reserve facilities that can support IOT for multi-beam satellites that cover diverse geographical areas. Quite often availability constraints and RF transmission and/or licensing restrictions can prevent suitable base or ground stations from being utilized. For example, a ground station cannot simply transmit a certain frequency, at a certain power level, to an arbitrary orbital location. While there are ways to reduce the number of ground facilities needed, these solutions, if an option, require detailed analysis to assess the impact on Payload IOT campaign schedule, cost and complexity.

The system and method of the IOV invention reduces the need for specialized ground facilities. In addition, because IOV is conducted in the absence of an RF communications uplink, there are no RF transmission constraints that can impact use of the facility or translate into additional cost or complexity to the in-orbit verification campaign. The IOV configuration sequence produces an RF noise pedestal signature within the satellite, which can be received using any suitably-sized antenna that is located within the satellite's transmit coverage pattern area. The noise pedestal signature is unique to the on-board hardware and produces a response that, when combined with on-board specific telemetry and overlaid with the pre-launch baseline, allows for the assessment of performance to be made in an efficient manner.

Figure 3:
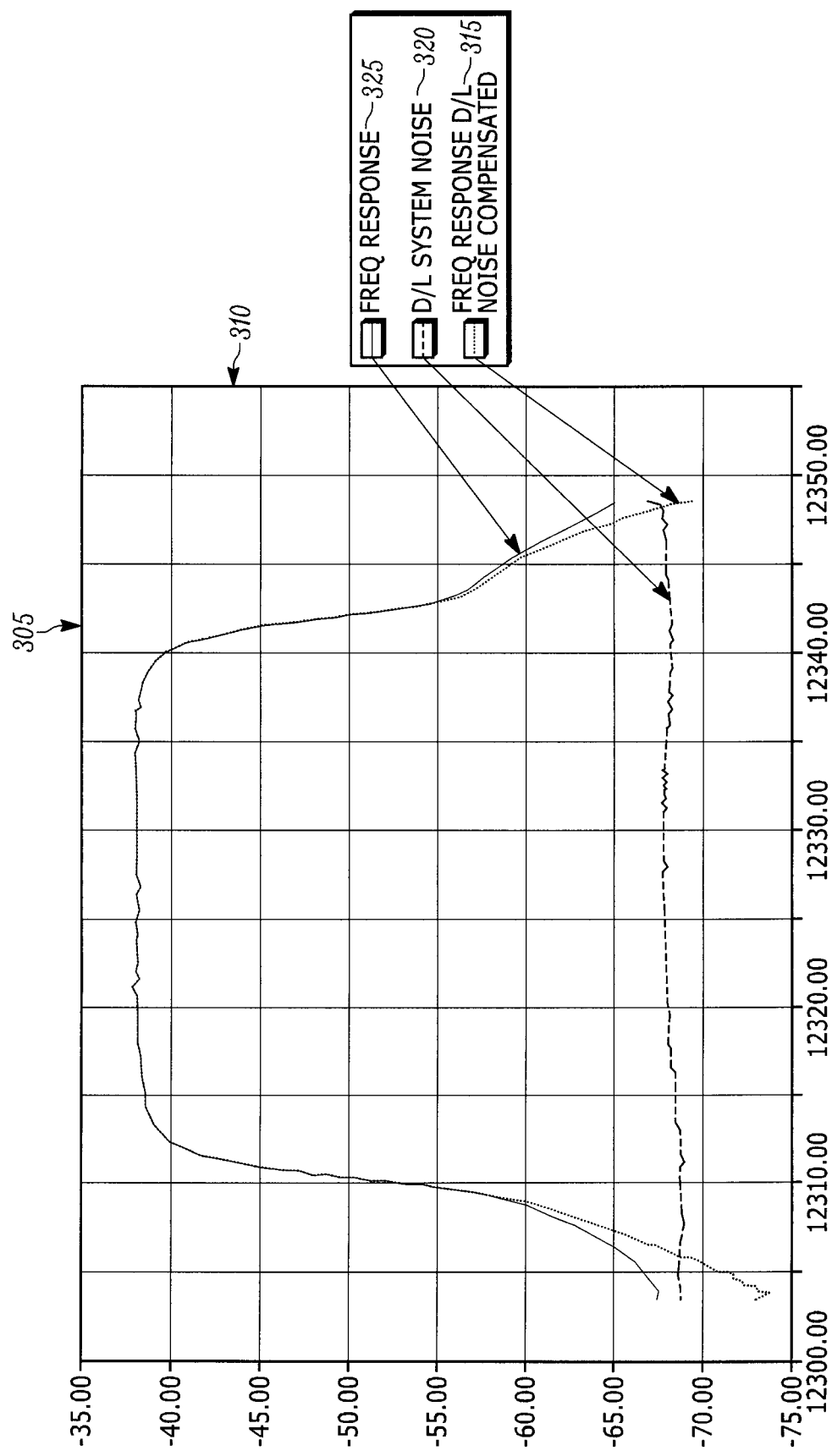
FIG. 3 presents an exemplary frequency plot for the output of a satellite communications transponder in the absence of any RF uplink signal, demonstrating how channel frequency response (frequency vs amplitude) can be routinely measured, using a single piece of RF test equipment to capture the "noise pedestal" output of a transponder when it is driven by the constant noise output of the on-board communications receiver.

FIG. 3 presents an exemplary frequency plot for the output of a satellite communications transponder in the absence of any RF uplink signal, demonstrating how channel frequency response (frequency vs amplitude) can be routinely measured, using a single piece of RF test equipment to capture the "noise pedestal" output of a transponder when it is driven by the constant noise output of the on-board communications receiver. The x-axis 305 of FIG. 3 shows the frequency (a range of 12300-12355 MHz in this exemplary case), while the y-axis 310 shows the amplitude in dB. The various traces highlight how, through the use of noise extraction, the dynamic range of the measurement can be extended (labelled "Freq Response D/L Noise Compensated" 315) and how the signal variation induced within the receive system can be removed by utilizing the Sun calibration technique (labelled "D/L System Noise" 320). That is, because noise is additive, the measured download system noise can be subtracted from the measured frequency response 325 to arrive at the actual frequency response of the system. The measured frequency response has a pedestal shape because the thermal noise is shaped by the on-board channel filters located at both the input and output sections of the repeater, the TWT amplifier (travelling wave tube amplifier) being in the middle. Other arrangements of payload components may have different shapes and frequency signatures, but this has no affect on the invention.

Figure 4:
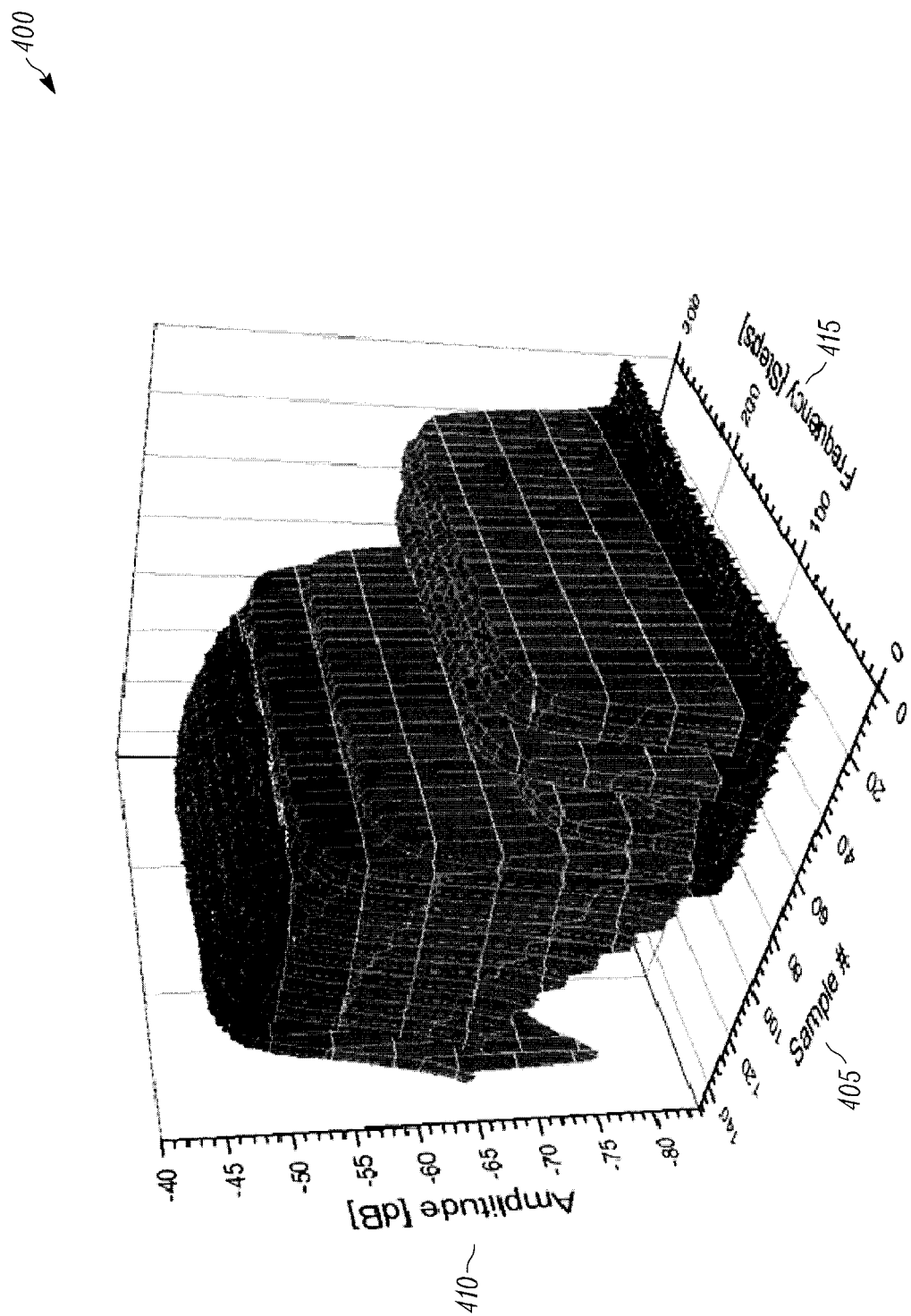
FIG. 4 presents a "waterfall" plot exemplifying the transponder noise pedestal amplitude variation over time as the gain and mode of the channel under test is changed.

FIG. 4 presents a "waterfall" plot 400 exemplifying the transponder noise pedestal amplitude variation 410 as the gain and mode of the channel under test is changed, using a series of commands to the satellite by the ground control station. Thus, each "sample" 405 in FIG. 4 presents a noise pedestal per FIG. 3 (frequency 415 vs. amplitude 410); each slice in the sample plane being a snap-shot of a spectrum analyser display for a given state (switch settings, gain setting, etc.) for the channel under test. FIG. 4 presents all of these snap-shots in a single 3D diagram so that any changes or trends are more apparent. This "waterfall" plot 400 is also known as an IOV command sequence, as moving along the sample axis from right to left, one sees the impact of changes in the system state per the programmed test routine.

Figure 5:
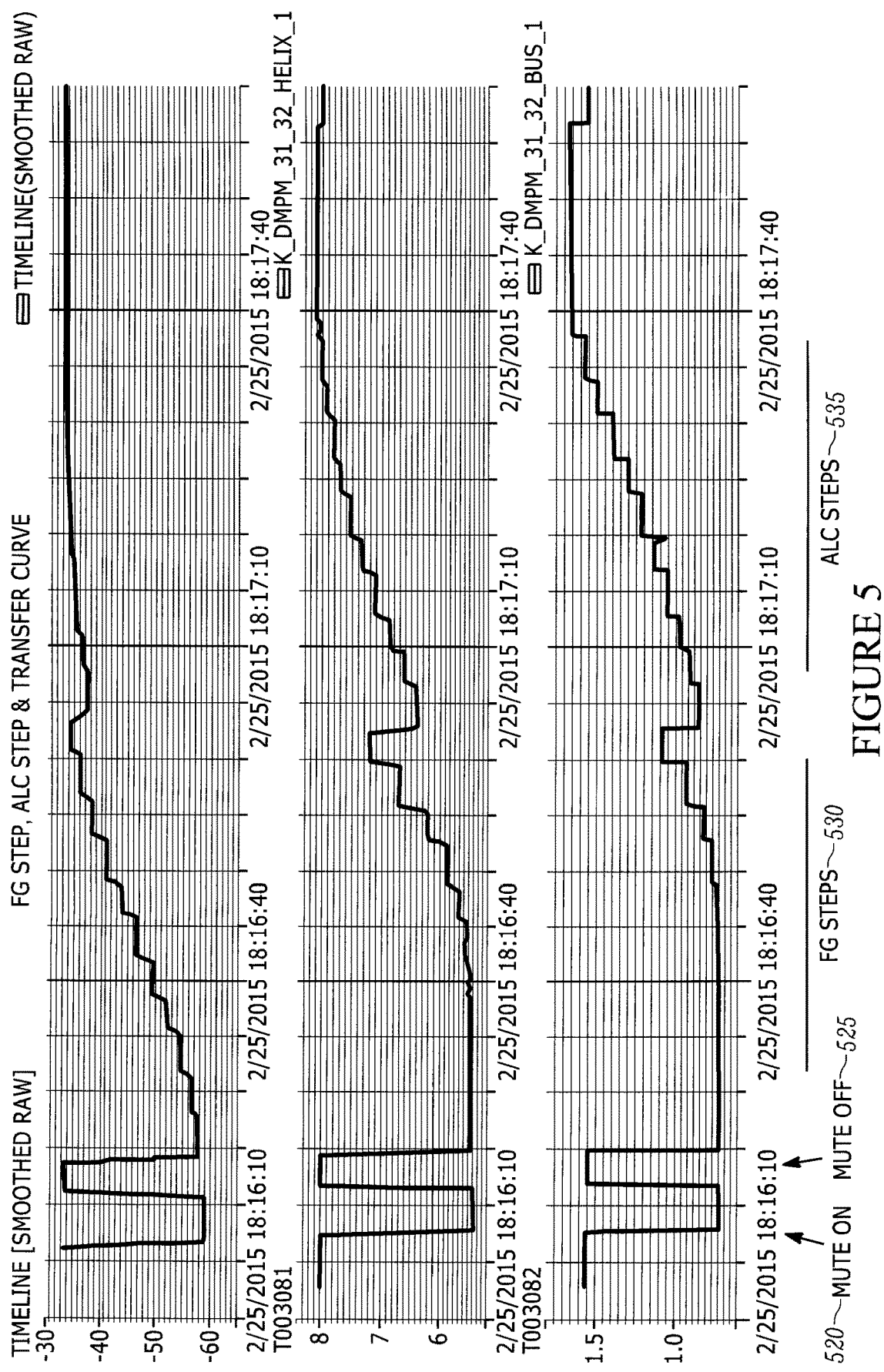
FIG. 5 presents an exemplary plot of average (processed) transponder noise pedestal amplitude variation and TWTA telemetry (helix and bus current) variation over time.

FIG. 5 presents an exemplary plot of average (processed) transponder noise pedestal amplitude variation and TWTA telemetry (helix and bus current) variation over time; basically, slices in the frequency plane of FIG. 4, with the data averaged and conditioned to remove system noise using the sun cal calculation, and possibly processed in other manners. As with FIG. 4, the amplitude variation for each of the displayed parameters is due to the gain and mode of the transponder under test being commanded, in sequence, by the ground. This sequence can include, for example, Mute On 520, Mute Off 525, Fixed Gain Mode attenuation steps 530, ALC Mode attenuation steps 535, and any other modes supported by the channel amplifier. That is, as one moves along the x-axis from left to right in FIG. 5, the transponder is stepping through different commands. Also, as would be clear to those skilled in the art, this sequence depicts a transfer curve response when the noise input to the amplifier (TWTA) is commanded from low to high gain states.

In addition, unlike traditional Payload IOT, the system and method of the IOV invention does not require the use of high power RF transmissions from the ground that, if not closely coordinated and rigorously controlled, can be a safety risk to the payload subsystem under test and cause interference to neighboring satellites.

2. Payload IOT Test Bench

Figure 1A:
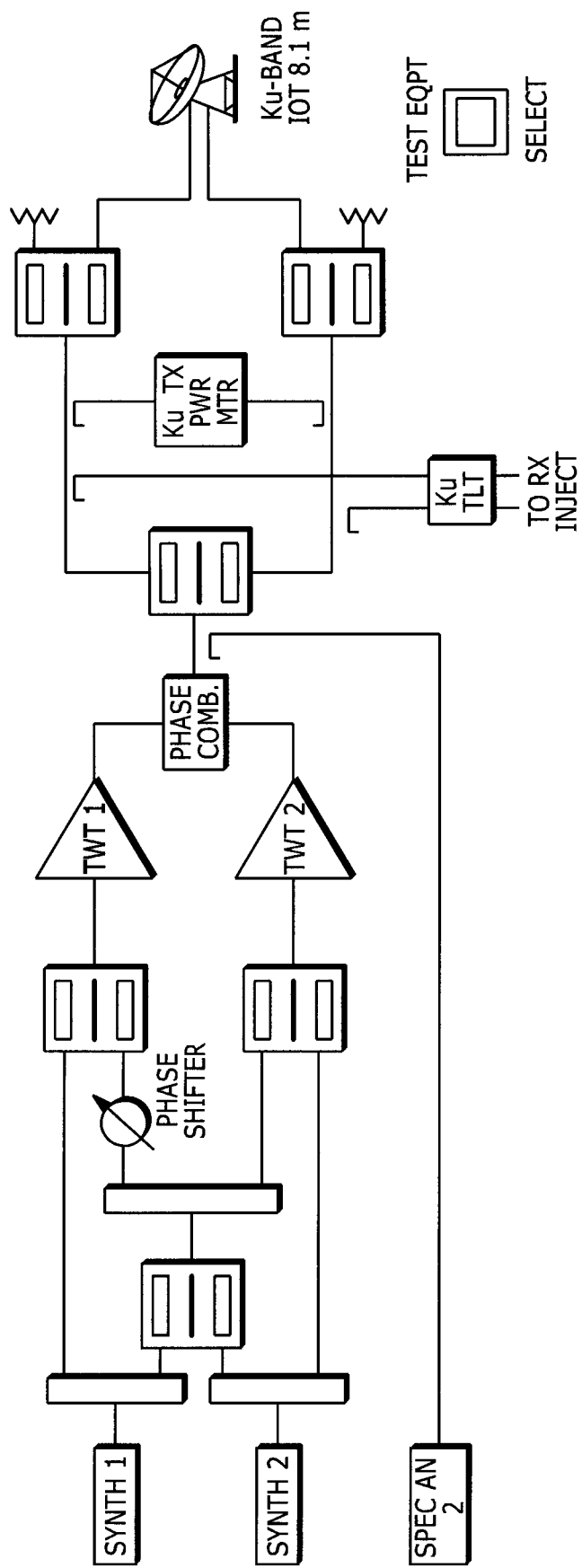
Figure 1B:
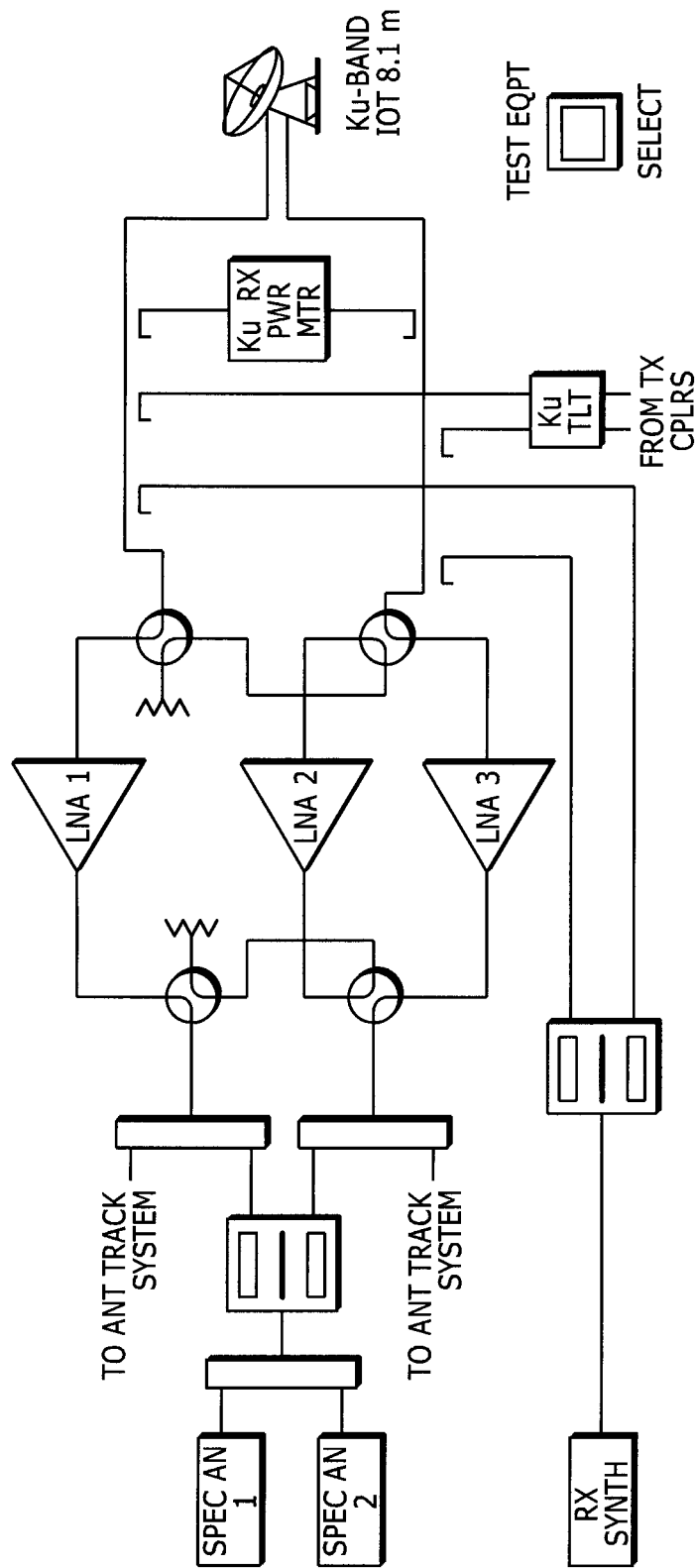

As noted above with respect to FIGS. 1A-1C, with each Payload IOT ground facility there is an associated IOT test bench which, in addition to complex containing racks of test equipment that interface with the facility at RF, has software-based systems that are used to conduct the numerous RF measurement types of a traditional Payload IOT. To ensure reliable and repeatable measurement results the hardware and software used to control, sequence and process the Payload IOT measurements must be fine tuned for 1) proper interfacing to each ground facility and 2) the mission specific capabilities of each payload, all of which can be a costly and time consuming effort. Additional complexity occurs when there is a requirement for more than one Payload IOT test bench to support multi-beam missions since each ground facility must be networked together, with often precise synchronization requirements for ensuring reliable and meaningful measurement results.

Figure 2:
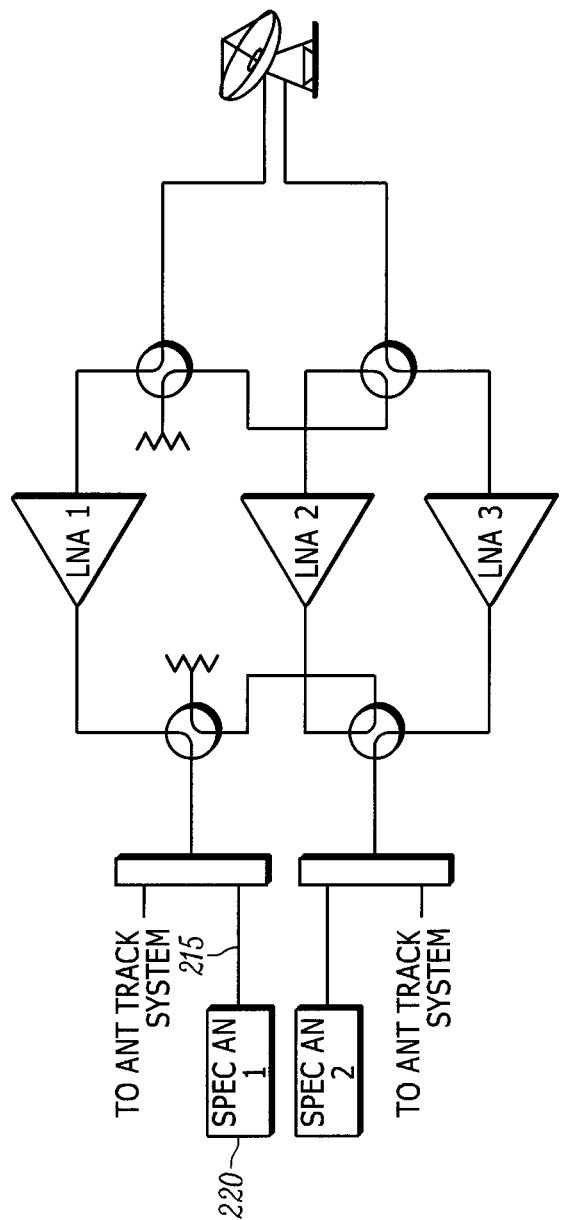
FIG. 2 presents a block diagram exemplifying the typical hardware configuration for an IOV ground station.

For IOV there is no need for a complex test bench. The unique, hardware specific, RF signature that is produced by an IOV configuration sequence is recorded by a signal analyzer or equivalent RF measurement device, that is interfacing to a common monitoring port 215 within the ground facility receive chain as shown in FIG. 2. In fact, all of the components shown in FIG. 2 are existing components except for the new signal analyzer 220. Key differences, in comparison with the IOT configuration of FIG. 1, are the elimination of the Earth station transmit (uplink) chain and the significant reduction in required RF test equipment down to a single type. For the set of proposed IOV tests, no additional RF test equipment is required at the ground facility other than the signal analyzer 220. Signal analyzers 220 are typically equipped with basic measuring algorithms, time-stamped data recording and trace storage capability. These inherent features are utilized for IOV, eliminating the need for specialized, highly complex software based instrument control systems. A simple PC-based server resides at each remote site and acts as a repository for the signal analyzer trace captures that are obtained during each IOV configuration sequence. Following completion of each configuration sequence the trace capture results are transferred from the server to a centralized system for post-processing and results analysis. For multi-beam satellites each receive facility will be configured in an identical fashion, thus significantly simplifying the test bench requirements when compared to traditional Payload IOT.

3. Facility Calibration and Measurement Accuracy

In traditional Payload IOT, facility calibration and measurement accuracy is critical to ensuring the measurement of key RF parameters that define payload performance. Calibration of any IOT facility is both specialized and involved as it requires use of a traceable standard or reference to accurately determine overall gain and response of the facility at each of the IOT test bench RF interfaces. In addition, each independent piece of RF test equipment within the IOT test bench must have a calibration certification. This information, combined with knowledge of the measurement algorithms, is used to calculate the measurement accuracy estimates for each Payload IOT measurement type. Furthermore, errors due to weather-related effects, which must also be estimated and assessed at the time of measurement, often impact the measured data. If there are inconsistencies or biases in the Payload IOT measured results (as compared to the pre-launch prediction), it is not uncommon for extensive audits of the site calibration and system measurement accuracy to negatively impact the Payload IOT campaign.

Unlike Payload IOT, which consists of an independent set of closed loop, absolute RF measurements, IOV is a series of comparative, open loop measurements. The configuration sequence utilized for each IOV measurement has a predefined series of commanded transponder modes that produce a unique measurement signature (of the transmitted noise pedestal) that is captured by the signal analyzer. The configuration sequence that is performed in-orbit may also, but not necessarily, be performed prior to launch utilizing the same highly stable and repeatable repeater configuration, with the output of the on-board communications receiver with input switched from antenna to load. Satellite communication payloads typically have matched load inputs/redundant front ends which can be switched from the antenna. But a 'load' is not required at the payload input per se, as front end components generally have high impedance inputs to terminate oscillations and the like. In-orbit results assessment may be accomplished by direct comparison of the processed IOV results with the pre-launch baseline to confirm that all recorded data matches within a pre-established set of simplified pass/fail criteria. As an example, the pass/fail criteria for determining that the functionality of a TWTA amplifier has not changed since launch may be as follows: For the IOV sequence very close overlap between the pre-launch and in-orbit responses for both the RF and telemetry, bus current (Ib) and helix current (Ih), is expected. More specifically, the RF transfer profiles will be within a few tenths of a dB from step to step as the FG and ALC step profiles are commanded, including any other commanded modes such as amplifier input switch out. For the Ih & Ib telemetry the values are expected to remain within 1-2 bits (raw) when comparing the in-orbit data with the pre-launch data. Similar tight tolerances may apply to each of the IOV measurement types though, of course, the user of the system may choose any tolerance that he wishes. Alternatively, in-orbit data may simply be compared against a performance specification, again, with any tolerance that is desirable.

An absolute calibration of the ground facility transmit and receive chain is therefore not required with the IOV system. However, for IOV, it is important to have accurate knowledge of the relative gain of the ground-based test facility's receive chain. This is accomplished by pointing the test facility antenna to the Sun, which is utilized as a stable broadband RF reference, to accurately obtain the test facility response at all measurement frequencies.

Figure 7:
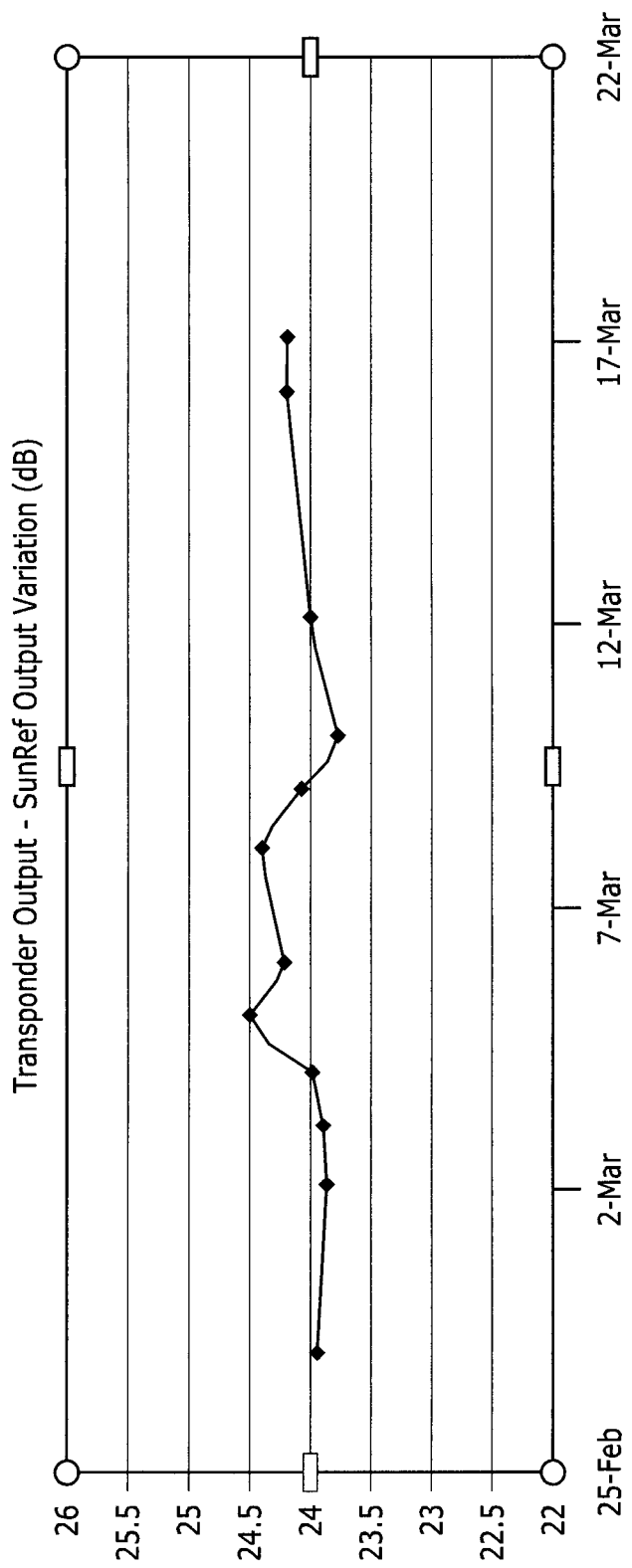
FIG. 7 presents an exemplary plot highlighting a series of difference measurements (satellite transponder power minus solar power) made over time.
Figure 8:
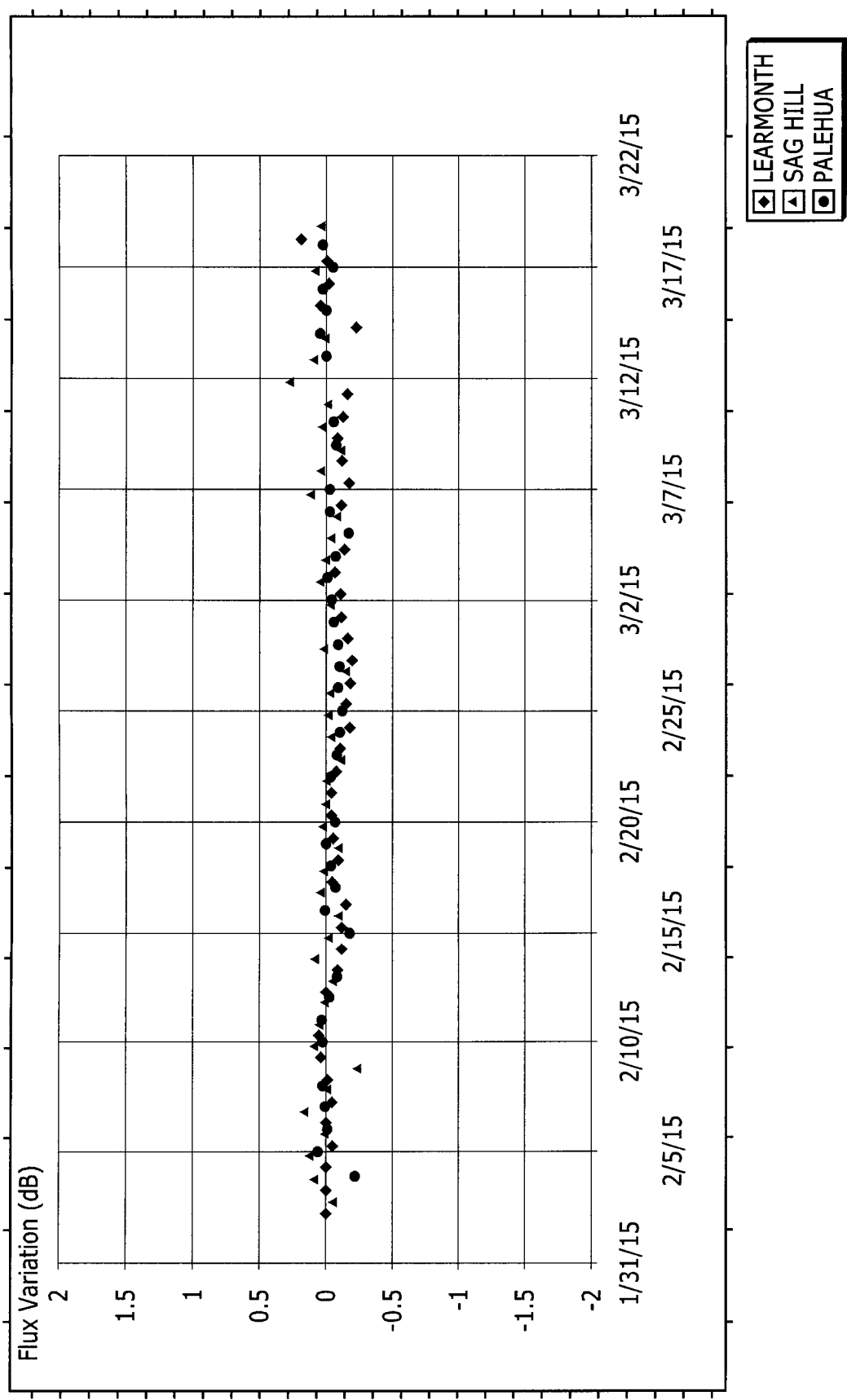
FIG. 8 presents an exemplary plot highlighting the stable nature of the 15.4 GHz solar flux as measured at three geographically diverse solar observatories, on a daily basis, over an extended duration (weeks).

FIG. 7 presents an exemplary plot highlighting a series of difference measurements (satellite transponder power minus solar power) made over time. Over the three week period of the plot, the difference measures are no more than ±0.35 dB. This plot's stability serves to highlight that, with IOV, both the effects of atmospheric gain variation and receive station gain variation can be negated from measurements through the use of the sun cal technique. FIG. 8 presents an exemplary plot highlighting the stable nature of the 15.4 GHz solar flux as measured at three geographically diverse solar observatories, on a daily basis, over an extended duration of over seven weeks.

Figure 11A:
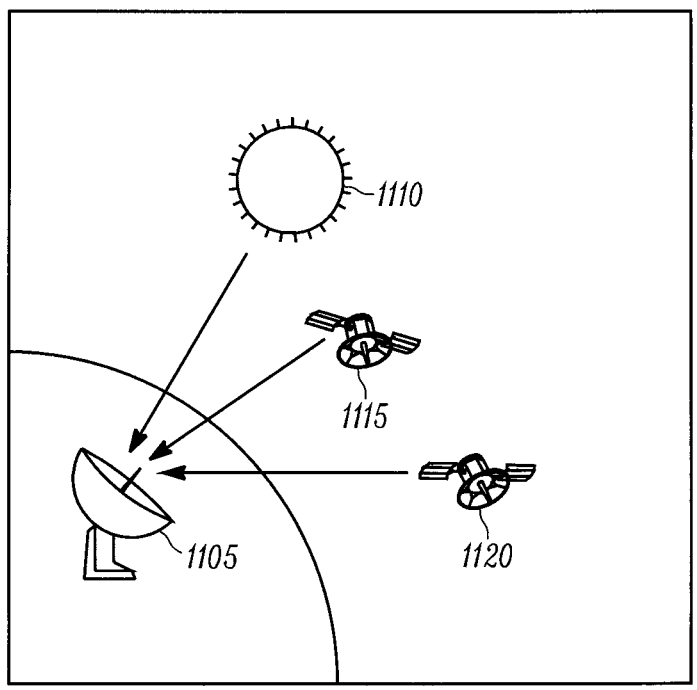
FIGS. 11A and B present an exemplary procedure sequence for obtaining in-orbit phase IOV results for a representative channel.
Figure 11B:
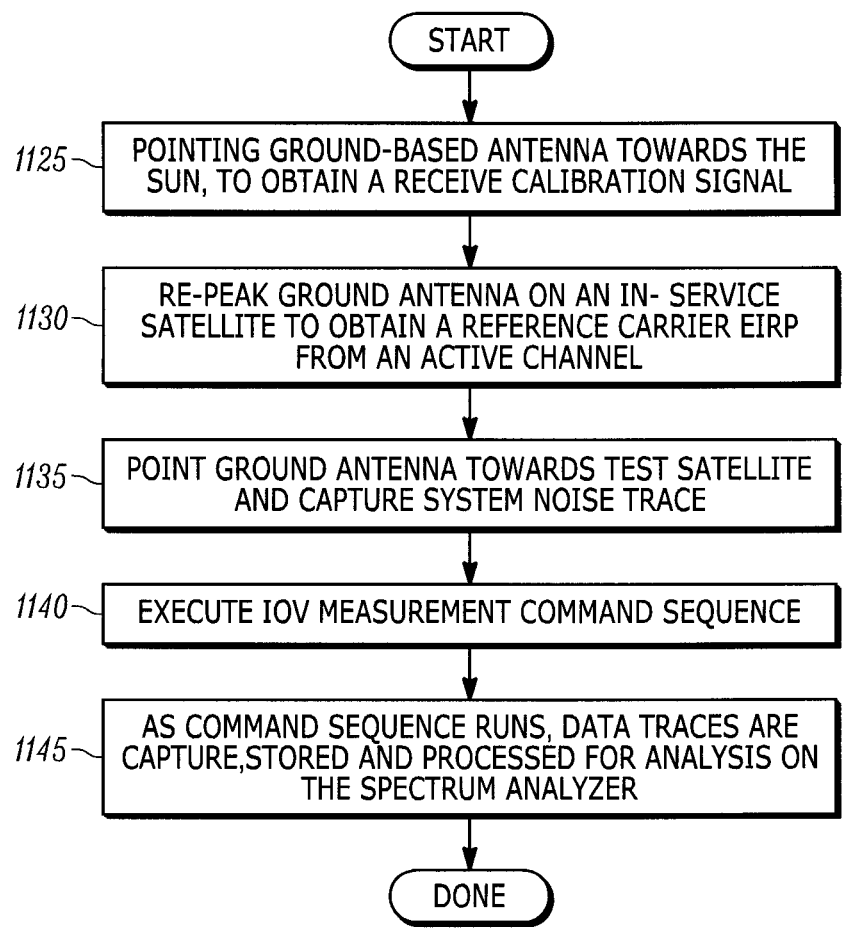

FIG. 11B presents an exemplary procedure sequence for obtaining in-orbit phase IOV results for a representative channel. This process uses the ground antenna 1105, the Sun 1110, an existing in-service satellite 1115 and the test satellite 1120 as shown in FIG. 11A. The process begins 1125 by pointing the antenna 1105 of the ground-based test facility towards the Sun 1110, to obtain a receive calibration signal across the test channels. Next, the ground antenna 1105 is repeaked 1130 (i.e. aimed towards) on an in-service satellite 1115 to obtain a reference carrier EIRP from an active channel. The ground antenna 1105 pointed at the test satellite 1120 is then repeaked 1135 and the system noise trace is captured on both polarizations (with the payload muted). Using the realtime control system, a given IOV measurement command sequence is then initiated on the test channel of interest 1140. As the command sequence runs, the data traces are captured, stored and processed for analysis on the spectrum analyser 1145.

Figure 9A:
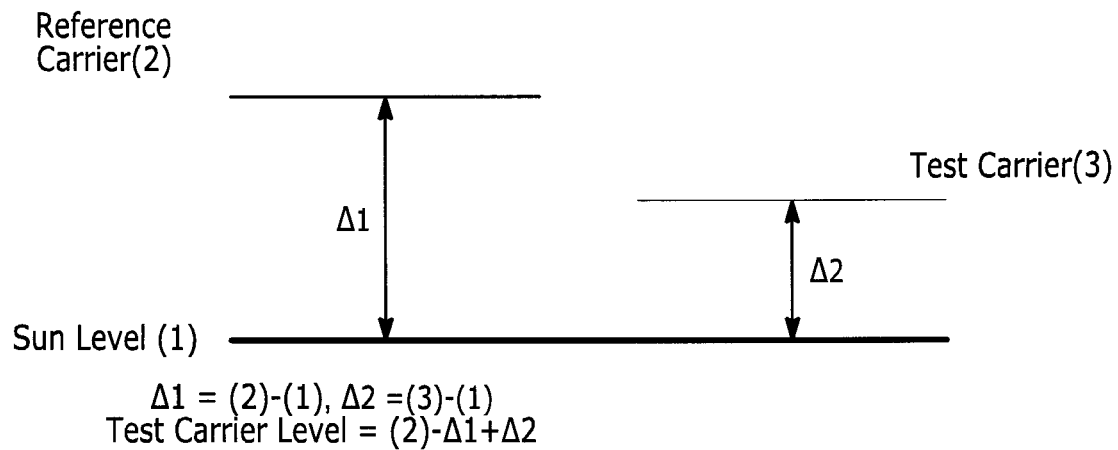
FIG. 9 presents an exemplary method for determining satellite transponder EIRP of a test carrier by utilizing the Sun and an existing satellite with a reference carrier.
Figure 9B:
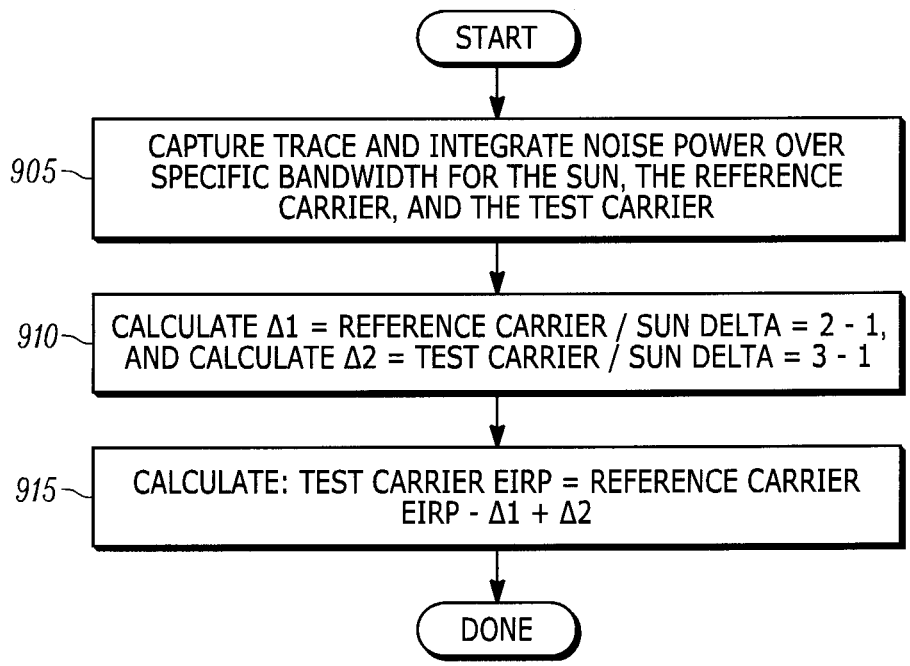

The measurement of transponder Effective Isotropic Radiated Power (EIRP) is also considered comparative in the context of IOV. That is, the IOV noise pedestal EIRP value is obtained by utilizing the Sun as an intermediate reference to transfer, through basic calculation, the known and established EIRP value of an existing source (i.e. digital carrier on any active transponder). FIGS. 9A and 9B present an exemplary method for determining satellite transponder EIRP of a test carrier by utilizing the Sun and an existing satellite with a reference carrier, of known EIRP, to make the calculation relative, rather than absolute, using an un-calibrated test facility for measurement. This process proceeds as follows:

Step 905—capture trace and integrate noise power over specific bandwidth for the Sun, the reference carrier, and the test carrier;

Step 910—calculate $\Delta 1$=reference carrier/Sun delta=2−1, and calculate $\Delta 2$=test carrier/Sun delta=3−1

Step 915—test carrier EIRP=reference carrier EIRP−$\Delta 1$+$\Delta 2$

The effects of weather, including atmospheric scintillation, can impact the absolute measurement of RF power during traditional Payload IOT. These effects become more prominent at higher microwave frequencies. The impact of weather, including atmospheric changes, on IOV is not an important factor providing that attenuation levels are relatively stable during the short timeframe (typically 60-120 seconds) required to complete each IOV configuration sequence. This is because both the reference source (i.e. the Sun) and the DUT are located above the Earth's atmosphere and experience the same atmospheric effects. The IOV test methodology enables the common effects to be ignored and the base station is no longer required to compensate for the effects of weather as long as atmospheric stability exists within the timeframe required to complete a measurement.

4. Frequency Coordination

Frequency coordination can be a major driver of any Payload IOT schedule. The significant increase in the number of in-orbit communications satellites across all regions of the orbital arc often necessitates extensive coordination of all Payload IOT uplink test carriers to ensure against interference to commercial services on neighbouring satellites that have overlapping frequency coverage. Often restrictions are put in place on when high power CW (continuous-wave) tests can be performed. These restrictions can result in delays that may significantly extend the Payload IOT schedule.

IOV repeater tests are completed without an RF communications uplink and with the transponder input switched offline. Isolation of the transponder input eliminates uplink interference impacting measurements. The IOV noise pedestal transmissions can be considered equivalent in power density to a wide-band digital carrier. As a result the noise transmissions have less interference on existing traffic and are easier to coordinate when compared to the traditional, high density CW carriers used for Payload IOT. In addition, the relatively short duration needed to complete an IOV measurement sequence on each transponder can be easier to coordinate with adjacent operators due to the relative minimal impact on their services.

5. IOT Schedule—Planning and Execution

A Payload IOT campaign can be extremely challenging to complete within scheduled timeframes. Teams of highly specialized personnel are required to oversee and manage multiple disciplines including: 1) satellite control including payload on-board configuration, 2) RF facilities configuration and control, 3) IOT test bench configuration and control, and 4) IOT results processing. With proper direction, coordination and technical oversight, the activities of each team must mesh together to ensure a successful Payload IOT campaign. Without tight control of all activities even minor issues can have a significant impact on overall schedule. The process is made more difficult due to the long hours, and multi-shift requirements of a typical Payload IOT campaign.

In contrast, the highly stable and repeatable on-board payload configuration utilized for IOV combined with the streamlined test methodology and simplified requirements for both the ground facility and test bench allow for full automation to be used for managing the processes outlined above. While there is still considerable planning required for a Payload IOV, in order to ensure proper and effective execution and results production, a significant amount of this workload is accomplished prior to launch, supporting the planning, preparation and execution of the factory baseline RF measurements. All command scripts required to configure the satellite repeater and to run the IOV configuration sequences are preferably fully tested and validated against the satellite prior to launch. These exact same scripts may then be utilized for the in-orbit phase of measurements. Unlike Payload IOT, the results obtained for the factory baseline can be compared directly with the in-orbit phase results using automation. Thus, when compared to Payload IOT, IOV significantly reduces both the time and manpower required to plan and execute an in-orbit campaign. Also notable is that these benefits of IOV, translate into a direct cost savings.

6. IOT Results Review and Data Buy-Off

The Payload IOT results review and buy-off must be performed by a team of supplier and customer payload specialists who review, assess and compare measured results against those obtained during pre-launch ground testing. This team is assembled together at a location that is often remote from their normal place of work for the duration of the Payload IOT campaign. The Payload IOT buy-off process is a manual and time consuming task and, as a result of inherent inefficiencies, can significantly extend the Payload IOT schedule if results are not matching predictions and/or if repeat testing is required (e.g. due to weather or system issues). The specific and complex nature of the testing combined with the fact that the Payload IOT tests are independently performed under vastly different and varying procedures and conditions when compared to the pre-launch baseline, makes it difficult to enhance or streamline the Payload IOT results review and data buy off process.

Unlike traditional Payload IOT, the inventive IOV on-board repeater configuration and ground RF measurement techniques utilized for obtaining both the pre-launch baseline and in-orbit phase results is identical. The stable and repeatable on-board environment of IOV simplifies the results assessment and analysis requirements by eliminating much of the need for expert manual review. Thus, the assessment of the in-orbit vs pre-launch measured data can be accomplished using automated analysis techniques. Presentation of the results can also be automated using web-based tools for graphical and tabular results comparisons and summaries. As a result, the opportunity exists for both supplier and customer specialists to share and review results remotely via the Internet using on-line meeting tools.

Summary of IOV Benefits Over Traditional Payload IOT

IOV offers many advantages when compared to traditional Payload IOT. As highlighted below, these advantages serve to transform the process of verifying that the beginning of life in-orbit performance of a satellite communications repeater is meeting specification and that all associated hardware has survived the stresses of launch:

Simplified ground-facility hardware and software requirements: all that is required on the ground is receive-only antennas with signal analyzer(s). Facilities that are not Payload IOT-capable can now be considered, generally at a cost savings;

Less complex test bench configuration used at each remote site reduces and streamlines hardware and software troubleshooting;

No RF uplink transmissions eliminates requirement for uplink frequency coordination as the majority of tests are performed with the receiver input switched to load. This also eliminates risk of payload damage due to improper application of RF uplink signals such as excessive overdrive;

Reduced requirements for downlink frequency coordination—noise signal carrier density is easier to coordinate than saturated CW signal. Fewer coordination constraints result in less blackout periods;

No requirement for facilities calibration using an RF standard. Sun reference provides a stable RF source for accurate relative calibration of all remote facilities;

Testing can be performed in any type of weather providing atmospheric fluctuations remain stable during the time required to run each transponder configuration sequence. The time require to run a sequence on a particular transponder will depend on the specific command set that is utilized to transition through the various transponder gain modes and states. This duration will also be dependent on the capabilities of the satellite-specific communications repeater hardware but will normally fall within the 60-120 second range;

Testing with repeater input disabled allows for stable and highly repeatable (self-diagnostic) configuration for both pre-launch and in-orbit phase testing. This also simplifies processing, analysis and presentation of results;

Minimum ~80-90% reduction in time required to test each transponder block, compared to Payload IOT. For antenna mapping, capability exists to test multiple beams at once which results in both a time and fuel savings. Simplified test suite and reduced test times also provides the option to test while drifting towards the final on-station longitude. If utilized this results in significant fuel savings as it is not necessary to relocate or stop the satellite at a specified longitude to conduct satellite testing;

Automation can be utilized for all aspects of IOV including: 1) transponder command sequence, 2) initiation of ground facilities measurement, data capture, and results transfer, and 3) results processing, analysis and web-based presentation. Achieving 100% automation is not possible using traditional Payload IOT methods. Enhanced automation directly translates into a significant reduction in manpower and schedule;

Simplified remote system trouble shooting: All remote facilities using similar RF test equipment, such as a signal analyzer, configured for basic trace capture mode; and Web-based results presentation provides the option for payload teams to remain at their home facilities throughout IOV.

Exemplary Implementation on Telstar 12V Payload

For the Telstar 12V program, there were several driving factors which impacted the possibility of conducting a traditional repeater Payload IOT in an effective and efficient manner. For example:

1. with its regional and spot beam capabilities across multiple frequency bands, combined with the requirement to test at or near its in-service longitude of 15 degW (to minimize propellant usage and schedule), frequency coordination played a major role in limiting test times and extending the schedule; and 2. the requirement to deploy/interface the traditional Payload IOT systems to third party RF facilities and the need to conduct tests in a non-loopback mode (separate Tx/Rx sites) added complexity in managing, operating and troubleshooting the system(s).

These constraints affected the possibility of successfully completing the Payload IOT in a short timeframe (i.e. typically a few weeks) consistent with previous satellite Payload IOT campaigns.

It was determined that a channel noise pedestal could provide a means, in the absence of an "active" CW test carrier per IOT, to characterize the frequency response of any RF channel. This provided the opportunity to streamline how the payload in-orbit test was performed. This "passive" method offers many advantages when compared to the "traditional" stepped CW frequency response characteristic of Payload IOT:

1. it is a "passive" test that requires minimal RF test equipment—only a signal analyzer is needed;

2. simplified measurement process, including station requirements, equipment set-up and test software complexity;

3. provides a significant reduction in measurement time (seconds vs minutes); and 4. offers reduced frequency coordination requirements when compared to active CW (i.e. Payload IOT) testing.

While, in principle, capturing a signal analyzer noise pedestal as a means to determine the frequency response of any channel seems straightforward, there are several factors that, if not accounted for, can contribute to errors. For example:

1) Test Facility Calibration and Response: Unless accounted for, the frequency response of the receive facility, including antenna feed and IFL (inter facility link), will impact the measured results by introducing slope and ripple within the recorded noise pedestal;

2) RF Interference: Unwanted signals from un-muted uplinks or adjacent satellites can corrupt or even prevent the measurement from being performed; and 3) System Noise Effects: As a result of the additive properties of noise the receive system noise floor will skew the shape of the pedestal at low levels (approaching the noise floor).

Note that the impact of items 1 and 2 applies to either measuring techniques (Payload IOT or IOV) and, assuming typical C/N (carrier-to-noise ratio) margins for Payload IOT, item 3 is specific to the noise pedestal technique. Through the use of the unique and proprietary techniques described herein, each of these three issues is addressed to eliminate or compensate for their effects on the noise pedestal response. C/N margins for Payload IOT can be very large, on the order of ~60 dB, depending on the facility.

With regard to item 1, Test Facility Calibration & Response, the Sun calibration technique described herein uses the Sun as a broadband noise reference, providing a simple and accurate means to characterize the relative end-to-end response of any ground station over any frequency band. This allows all station-induced gain variation to be eliminated, which was not previously possible using other available methods such as the SGH comparison technique. The "standard gain horn" (SGH) comparison technique utilizes a horn shaped antenna, whose physical dimensions allow for accurate calculation of gain, as a reference, when comparing the strength of a common signal received by both the horn and the IOT antenna. This accurate knowledge of the signal strength allows a fixed calibration factor to be derived for the IOT antenna at each common signal frequency. Calibration factors at other frequencies require a separate SGH comparison to be performed.

With regard to item 2, RF Interference, testing with the input of the repeater offline eliminates the effects of uplink interference on the measurement results. With the on-board receiver providing a stable noise source, the shape of transmitted noise pedestal will not be corrupted by external RF. The effects of downlink interference from adjacent satellites can be greatly reduced or eliminated by utilizing large test antennas, i.e. about 8 m and greater, and ensuring that testing is performed with at least ~0.5 degree separation from other satellites.

With regard to item 3, System Noise Effects; noise extraction can be used to calculate the true dB change of a noise signal when its level approaches the system noise floor, thus eliminating any skew as a result of noise addition. This is accomplished by first measuring the system noise floor in the absence of the IOV noise pedestal and then, through calculation, removing the additive effects of the noise floor contribution from the noise pedestal amplitude change. This technique provides a 7-10 dB extension of useful range when measuring the amplitude of a noise pedestal.

Figure 6A:
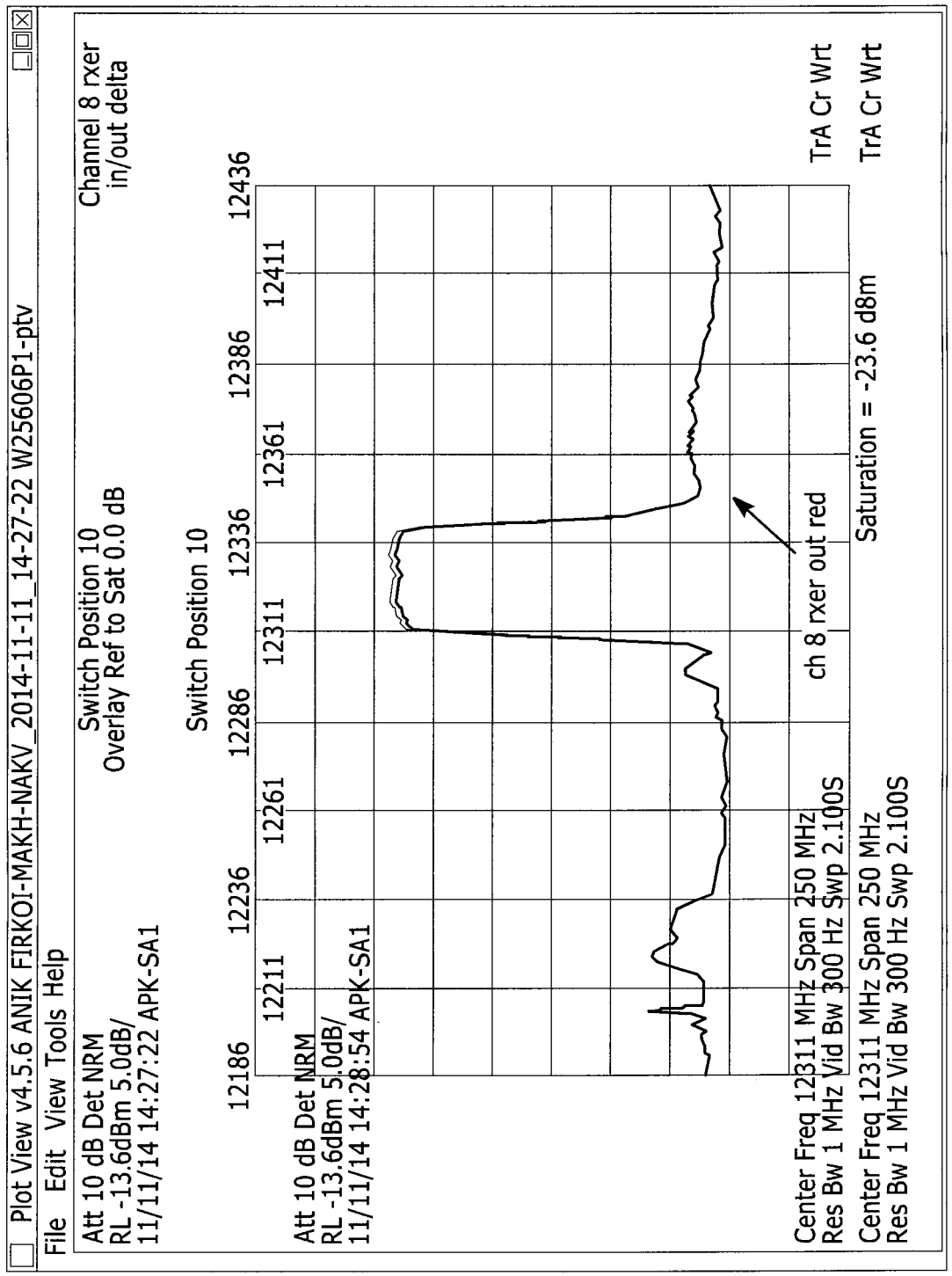
FIG. 6 presents exemplary plots of a transponder noise pedestal transmission with the satellite communications receiver switched to antenna (on-line) and to internal load (off-line). These plots highlight that the magnitude of the transponder noise pedestal remains sufficiently high when switched to load and, thus, can be utilized for IOV measurements.
Figure 6B:
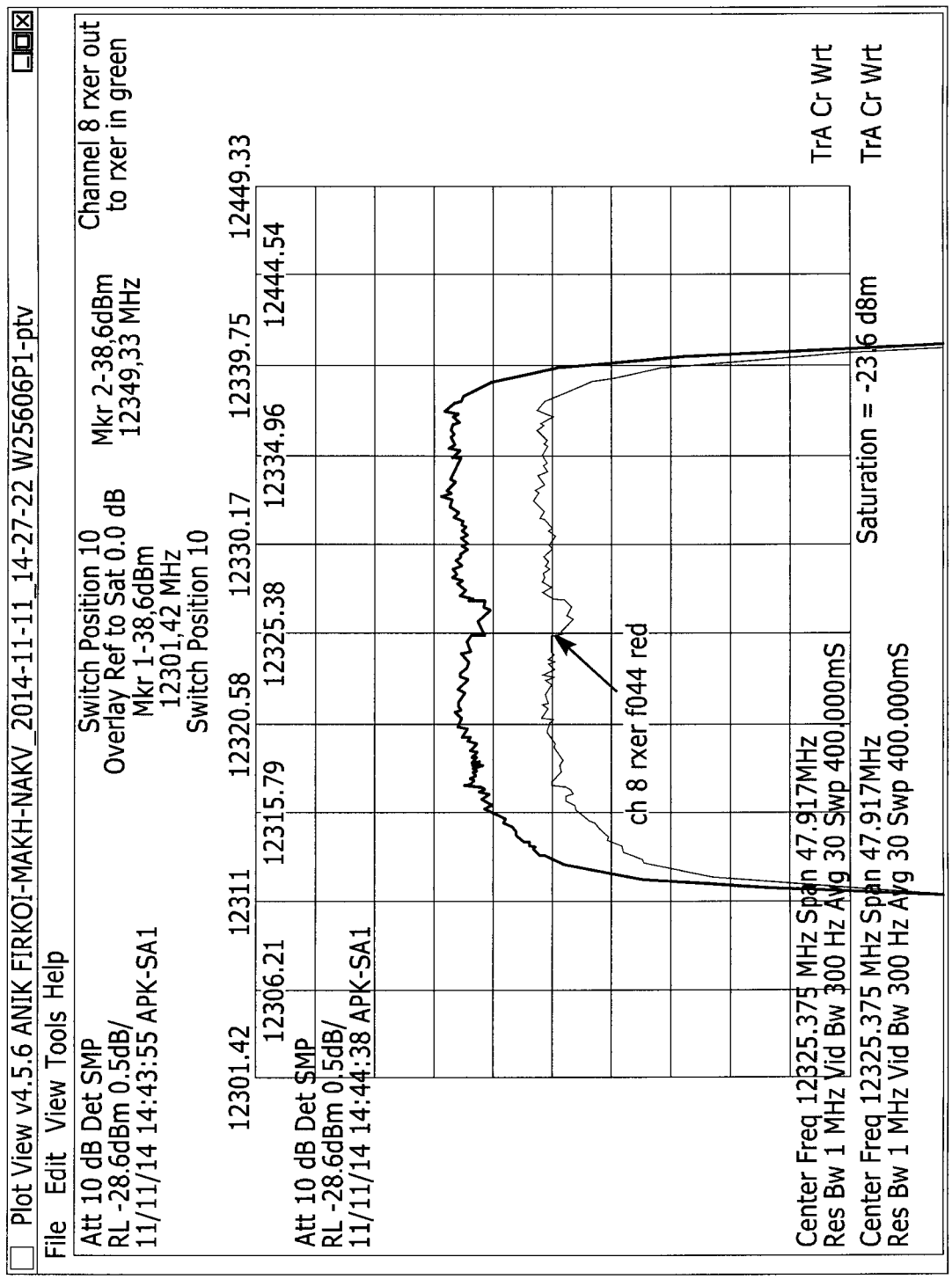
Figure 22A:
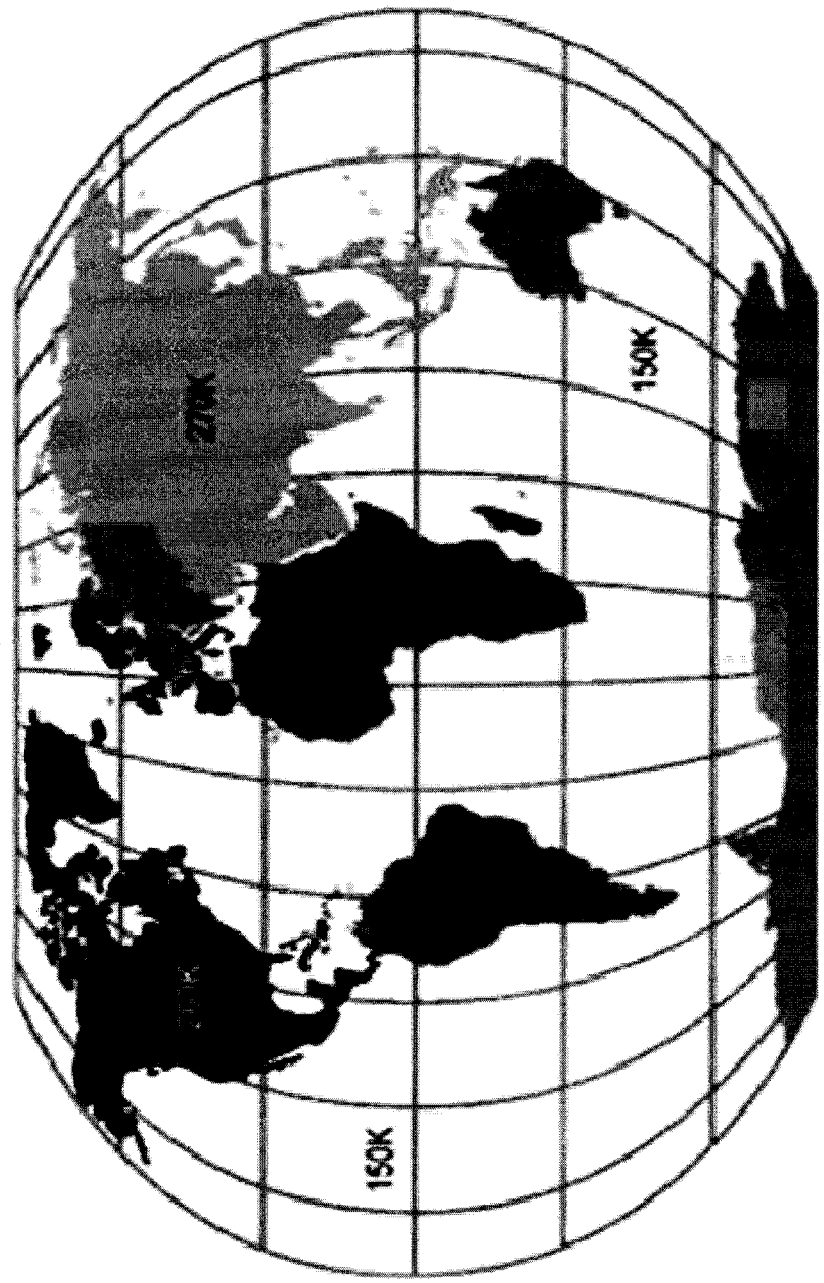
FIGS. 22A and 22B present respectively, a pictorial diagram of the ESA Ku-band temperature model of the Earth, and actual in-orbit measured results for the transmitted noise pedestal signal level change when the Nimiq 1 on-board receiver was switched between the receive antenna port and load.

The frequency plots of FIGS. 6A and 6B, demonstrate, through actual in-orbit test utilizing a transponder on the Nimiq 1 satellite, that, with the satellite's receiver input switched to an internal load (such as an RF termination), its output is sufficient to drive the channel amplifier with a noise signal (pedestal) that can be used for IOV. The noise pedestal shown in FIGS. 6A and 6B centers around the center frequency for the channel under test (a center frequency of 12311 MHz in this case), and has a 27 MHz bandwidth dictated by the amplifier design and filtering in the transmit chain of the satellite. Of course, there is no upload to the satellite to generate this noise signal. The internal load generates a wide-band noise signal that is amplified by the on-board receiver(s) and then filtered (by input and output channel multiplexers), routed (by switching networks) and amplified (by TWTAs or SSPAs) for transmission to the ground. The noise pedestal transmitted by the satellite is stable and reproducible regardless of whether the satellite is on the ground or in orbit. As previously highlighted, this configuration eliminates external factors, such as adjacent satellite uplink interference, which can corrupt the measured results when performing conventional Payload IOT. FIGS. 6A and 6B present the same data, but the plot of FIG. 6B highlights the noise pedestal magnitude change (<1 dB) when the input of the Nimiq 1 receiver is switched between load and antenna, with the antenna pointed towards the Earth (the Earth temperature is cooler than the load and is known, as shown in FIG. 22A, so one can determine that the satellite antenna is working properly). This serves to further demonstrate that the magnitude of the transmitted noise pedestal from the communications repeater, when the receiver input is switched to internal load, can be utilized for the purposes of IOV.

Figure 10:
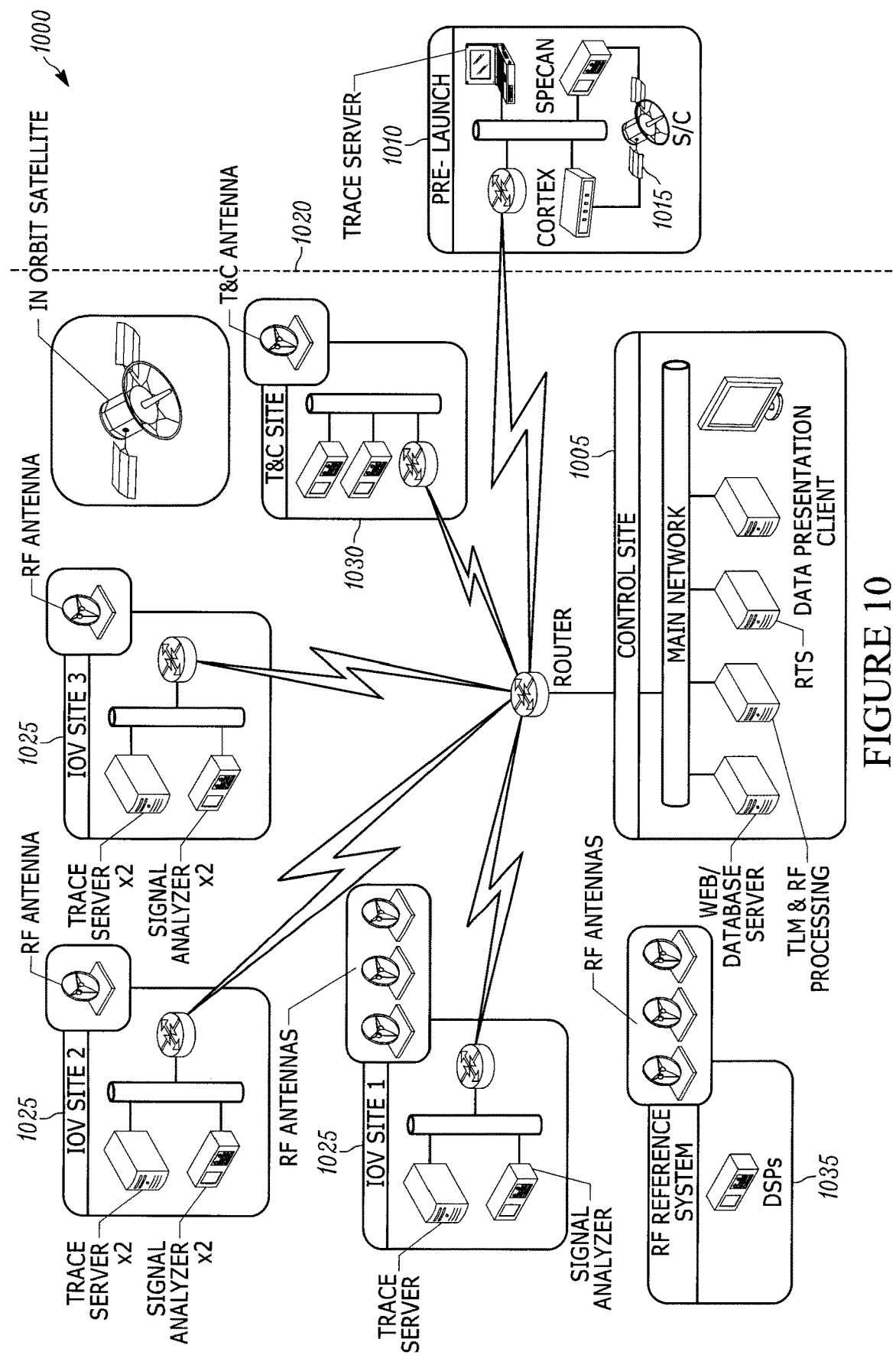
FIG. 10 presents an exemplary interface diagram for conducting both the pre-launch (factory baseline) and in-orbit measurement phases of IOV on the Telstar 12V satellite.

FIG. 10 presents an exemplary system diagram 1000 similar to the one which was successfully utilized for Telstar 12V Payload IOV. In short, the system 1000 consists of a control site 1005 which interconnects to a single location 1010 for the pre-launch (factory) measurements. All equipment used to communicate with the spacecraft 1015 and to collect the pre-launch RF measurement data typically resides in the same physical area as the spacecraft 1015 itself (i.e. as shown to the right of the broken line 1020 in FIG. 10). For the in-orbit measurements, which are performed after the satellite is launched, the same control site interconnects to any number of geographically diverse IOV sites 1025 and a T&C (telemetry and command) site 1030. Each of the IOV sites 1025 contains the same basic hardware for conducting the RF measurements. The T&C site 1030 is used for satellite command transmissions and telemetry reception in support of IOV operations. In addition, an RF reference system 1035 is utilized to establish a known EIRP value of an existing source (as described previously). All sites are interconnected by a communications system. Hardware and software for all IOV payload configuration commands, telemetry data retrieval and analysis, RF results (from remote sites) collection and results processing and web results publishing can reside at one central location (i.e. the control site 1005).

For the IOV factory measurements a signal analyzer 220 connected directly to the satellite transmit test interface port provided noise pedestal trace capture data as the IOV payload command sequences from the control site 1005 were issued. Control of the signal analyzer settings was also performed by the control site 1005 via network interface to the remote trace server. At the completion of each measurement sequence, trace capture data was electronically transferred back to the control site for post processing and web results publishing.

For the in-orbit phase of IOV, a T&C site 1030 was utilized for satellite command and telemetry data collection and IOV sites were used to collect RF data in the same manner as during the pre-launch factory measurements. The major difference with the in-orbit phase is that the satellite RF signals are received by the on-site antenna rather than a direct physical connection to the satellite (or DUT).

Figure 12:
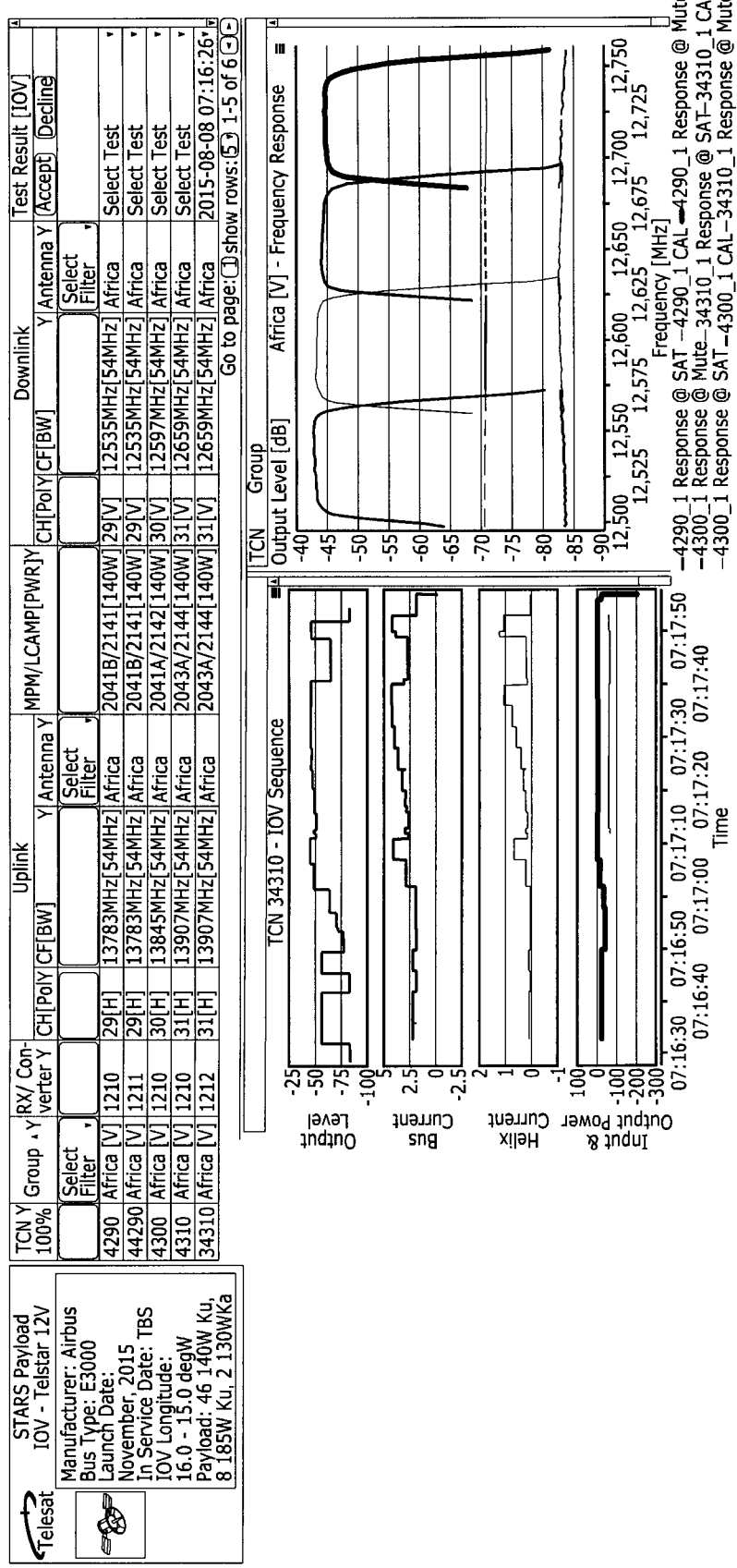
FIG. 12 presents an exemplary screen capture of a web tool developed to display the post processed results for Telstar 12V IOV.
Figure 13:
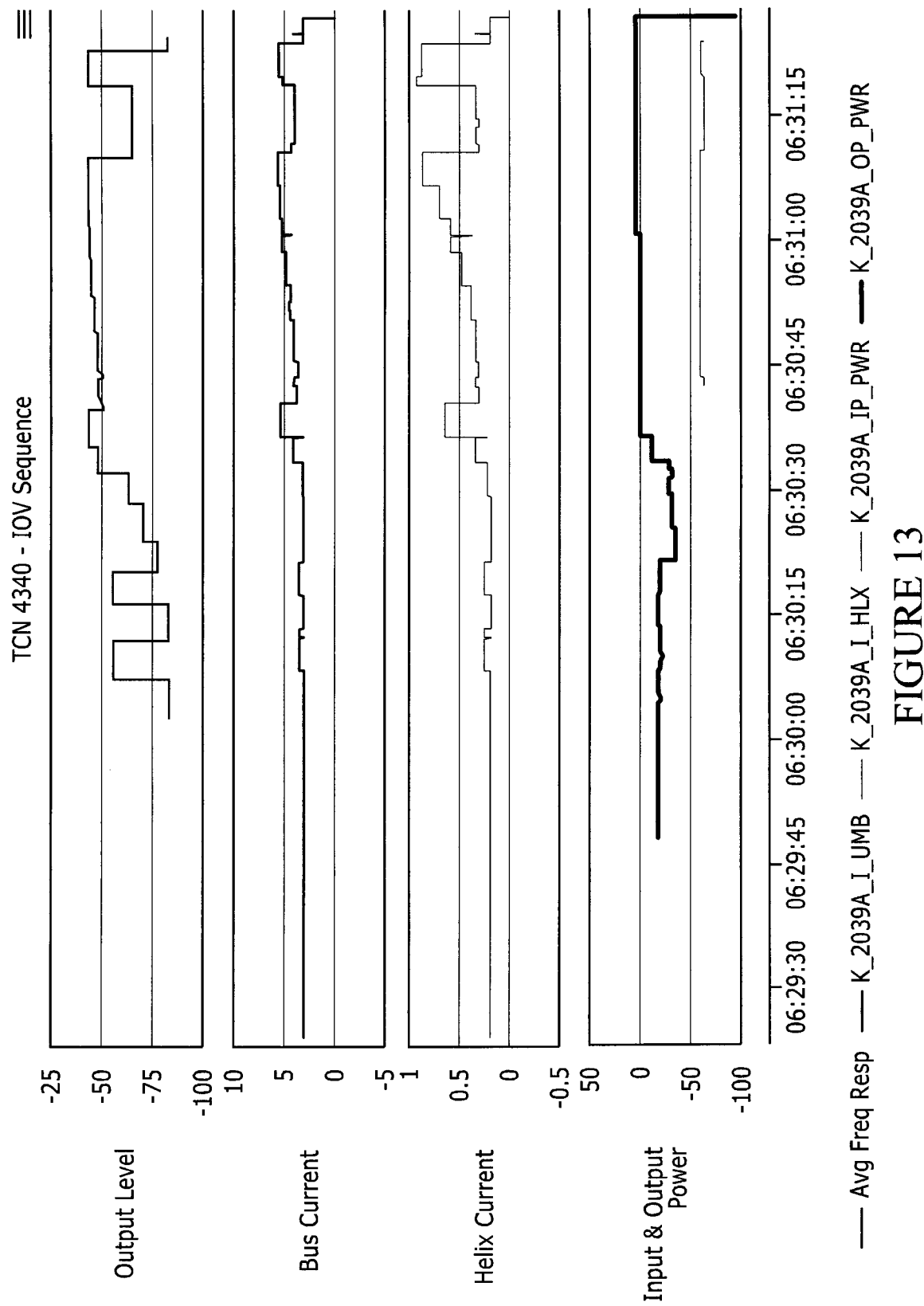
FIGS. 13 and 14 present exemplary pre-launch post-processed data (amplifier RF output and telemetry data) on a web-interface.
Figure 14:
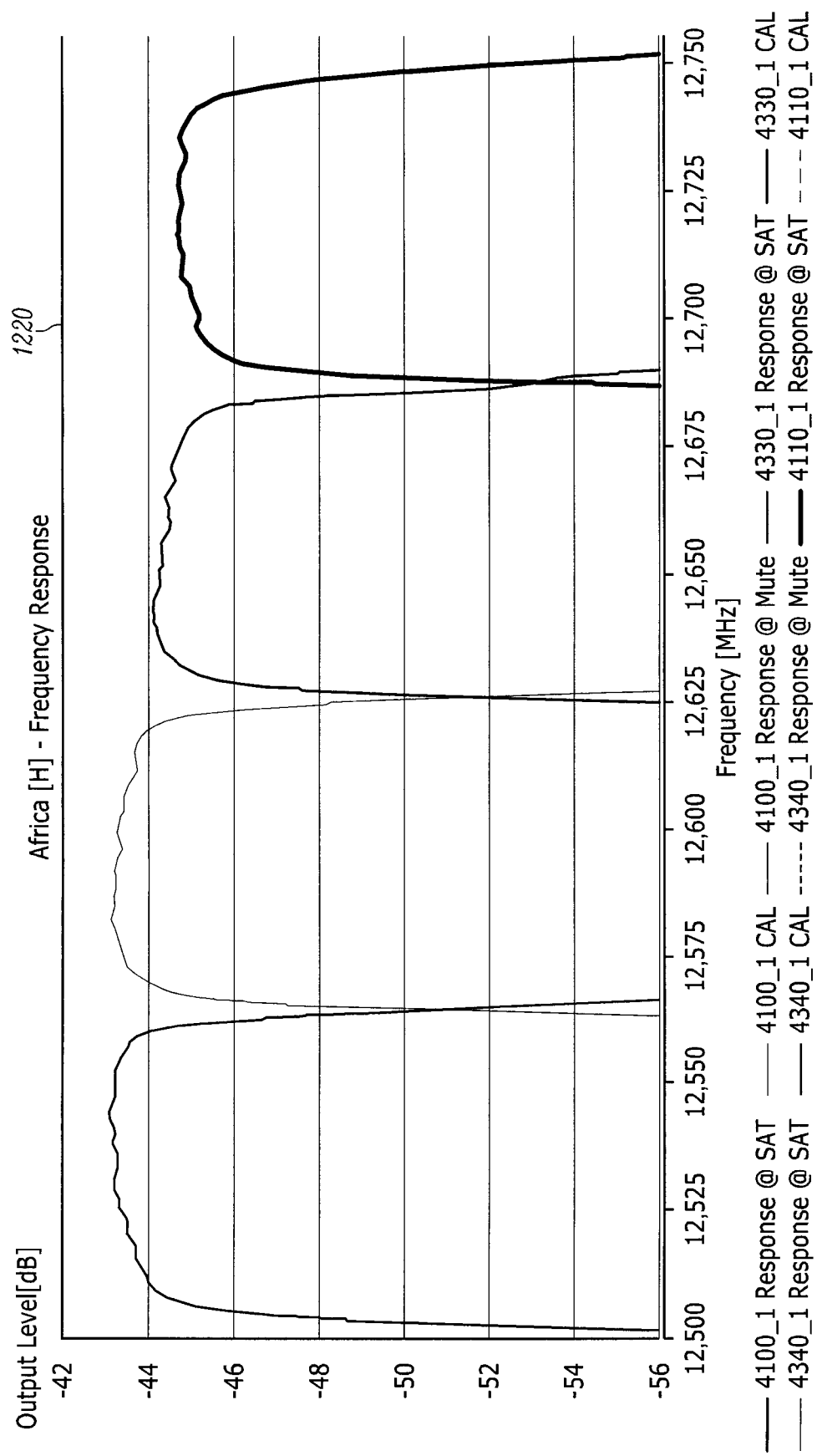

FIG. 12 presents an exemplary web interface for displaying IOV results following post processing and analysis. The plots shown are from actual results obtained from pre-launch IOV factory tests performed on the Telstar T12V Africa Beam. More specifically, the left hand plot 1210 shows post processed IOV sequence data (TWTA RF output and associated telemetry data) for a single channel on the Africa Beam. A similar exemplary IOV post processed sequence, for another T12V channel, is presented in FIG. 13. The steps that are apparent in FIG. 13 are due to the switching of states and gain, in the same manner as shown in FIGS. 4 and 5. The right hand plot 1020 of FIG. 12 shows the frequency response for all four Africa Beam horizontally polarized channels obtained directly from the noise pedestal data. This same data, but in a zoomed-in format, is presented in FIG. 14. The in-orbit IOV results may be presented using the exact same web interface for data review and results assessment.

Figure 15:
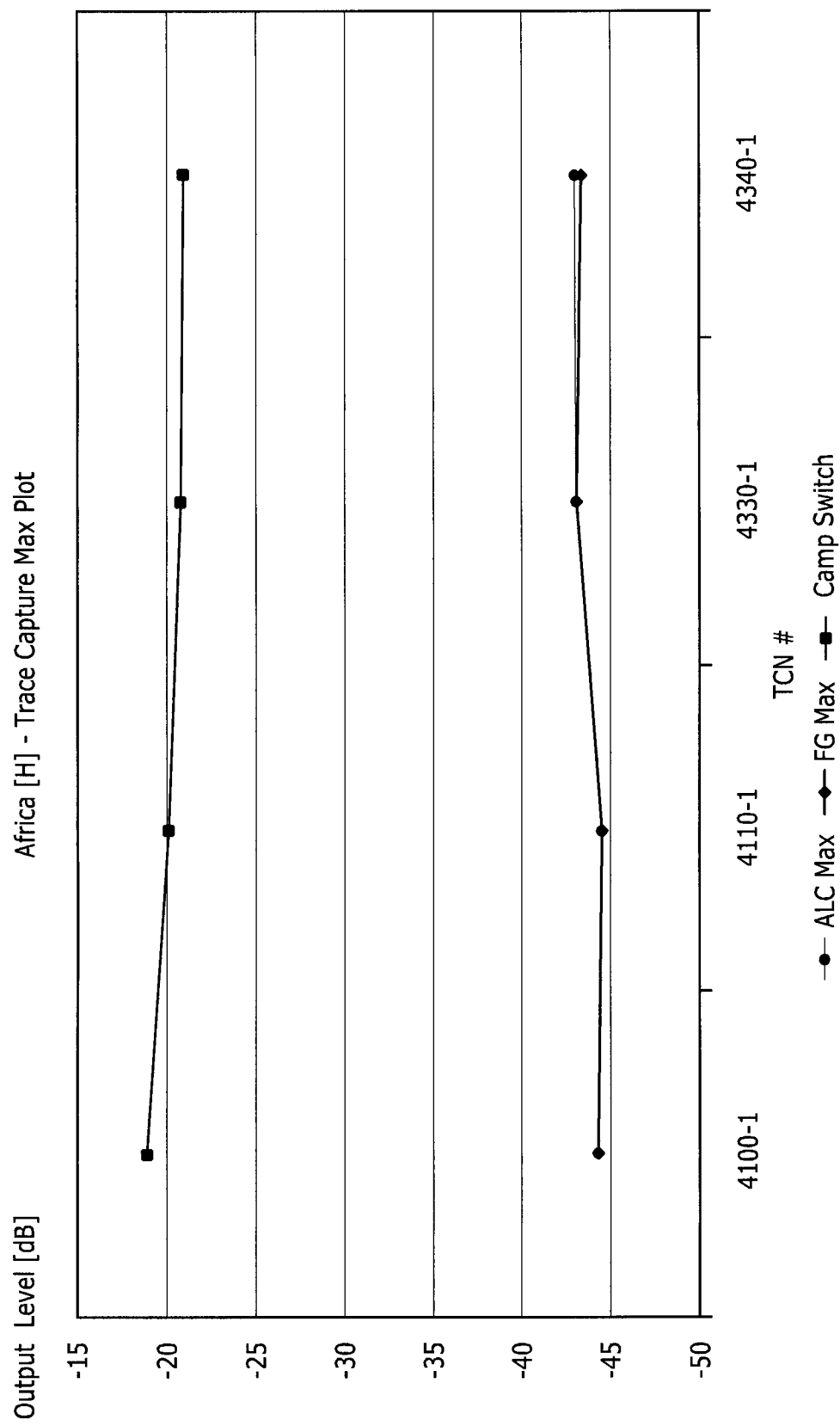
FIGS. 15 and 16 present additional exemplary pre-launch post-processed data on a web-interface.
Figure 16:
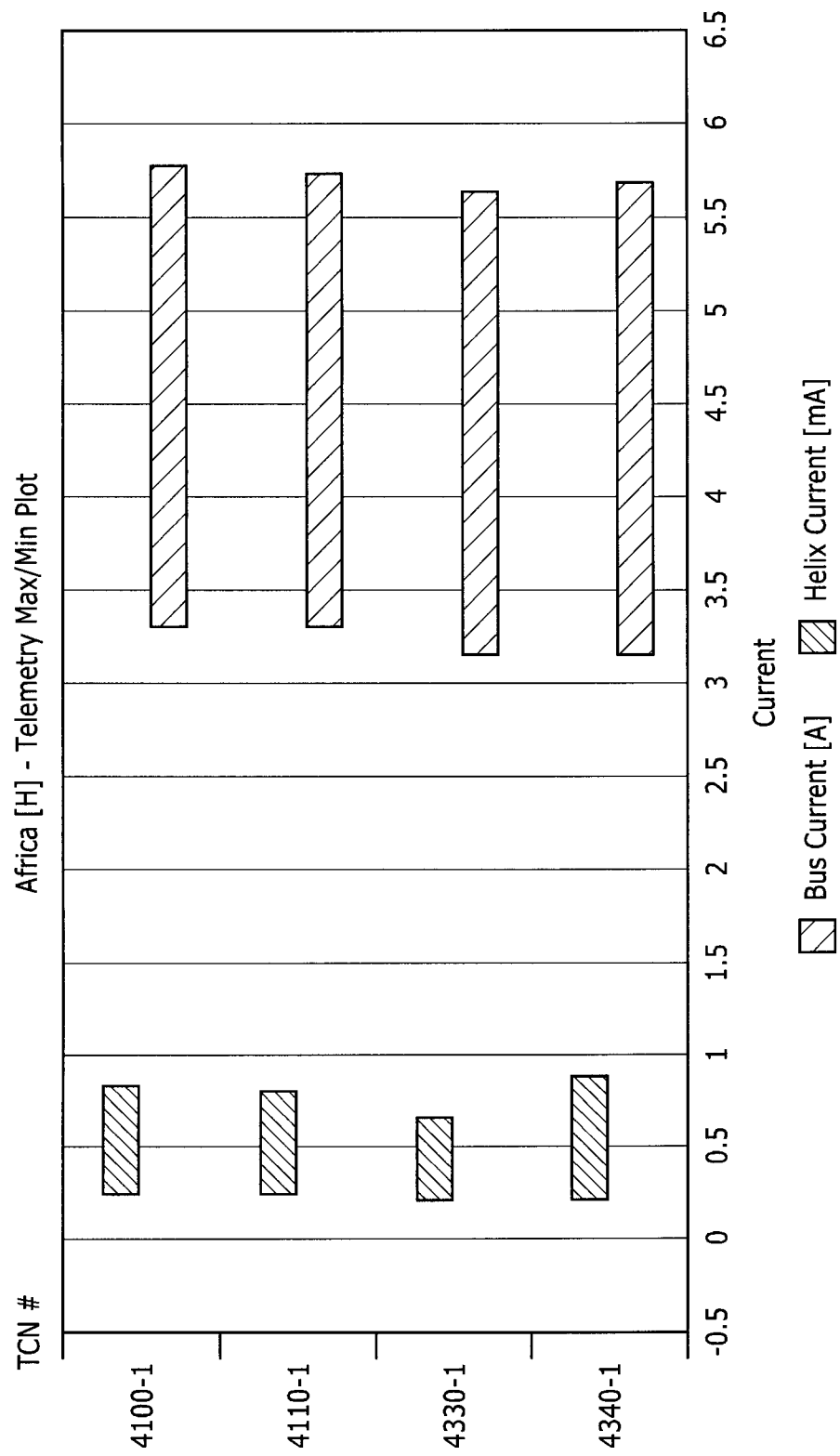

FIGS. 15 and 16 are exemplary of additional pre-launch, post processed, IOV results that are available in the web interface for the four Africa Horizontal Beam channels. FIG. 15 depicts recordings for the Fixed Gain and ALC (automatic level control) mode maximum noise pedestal levels and the noise pedestal measured delta (difference) level when the CAMP (Channel Amplifier) input switch is commanded to remove the receiver noise drive from the TWTA input. Assuming nominal performance, the results for this data set should be repeatable (within 0.5 dB) when IOV measurements are obtained during the in-orbit phase. An additional data set, for the calculation of EIRP utilizing the aforementioned Sun calibration techniques, was also presented when the in-orbit phase of IOV was completed. FIG. 16 depicts an exemplary plot of the minimum and maximum (no drive and full RF drive) recorded bus current (Ib) and helix current (Ih) telemetry for each of the four Africa H Beam channel TWTAs. When re-measured, during the in-orbit phase of IOV, this same telemetry data, assuming nominal repeater performance, should be within 1-2 bits when compared to pre-launch values.

With an exemplary implementation of the IOV invention, a full suite of RF measurements took approximately 90 seconds to complete for each on-board transponder. The noise output of the on-board receiver (with input switched to load) was used to drive the satellite communications system amplifier (e.g. TWTA) as it was commanded through various operational modes and gain states. RF noise pedestal data, captured by the receive station signal analyzer, was ingested, along with processed telemetry, into the system for fully automated data post processing, analysis and results presentation. Sun calibration eliminated the need to use conventional methods for calibrating any receive facility utilized for the in-orbit phase of IOV and the performance of an identical set of ground measurements, prior to satellite launch, allowed for full automation to be used for results assessment.

Specific to T12V, the following IOV payload command sequence was implemented for each channel:
1. Receiver Switch In—With transponder in normal throughput configuration. This configuration allows measurement of the antenna receive temperature
2. MUTE ON/OFF—Performed once for first synchronization and noise floor reference
3. Receiver switch Out—Performed to measure receiver noise figure and to isolate the test channel from possible external noise signals that could corrupt the test results.
4. MUTE ON/OFF—Performed for second synchronization
5. FG STEP LOW to HIGH—Fixed gain (FG) of the amplifier was selected to increase in steps over the entire range. As the channel gain is increased, the relative step size indicates whether the components are working properly or not.
6. ALC STEP LOW to HIGH—Amplifier switched to automatic level control (ALC) mode, with the level increased in selected steps over the entire range. This test is similar to test 5 but verifies different circuitry.
7. CAMP (Channel Amplifier) switch OUT/IN—performed to measure ALC dynamic range
8. MUTE CAMP—End Sequence Also, embedded within this sequence, are commands to interface with the remote station trace servers for controlling settings on the signal analyzers that are used to capture the RF noise pedestal data. When accounting for these additional commands, it took approximately 2 minutes to complete an IOV measurement sequence on a per channel basis. Different systems and configurations, of course, may require a different command sequence and timing.

Following approximately 3 minutes of post processing and analysis the results are available to be published on the IOV web display pages. The following measurement results were produced across all channels on the T12V communications payload:
Transponder Frequency Response
TWTA Transfer Curve including EIRP
TWTA Fixed Gain and ALC Gain Steps
TWTA Telemetry Calibration
ALC Control Loop Performance
Receiver Noise Figure
Transmit Antenna Cross Polarization Performance Using traditional IOT methods and systems the above measurements would take approximately 20 minutes to complete with additional time being required for manual review and analysis of the RF data. It should be noted that, for the T12V IOV, a low power CW uplink was used to complete the on-board receiver translation frequency measurement. The lower power CW level ensures against potential interference with adjacent satellites.

Transponder Frequency Response

Figure 17:
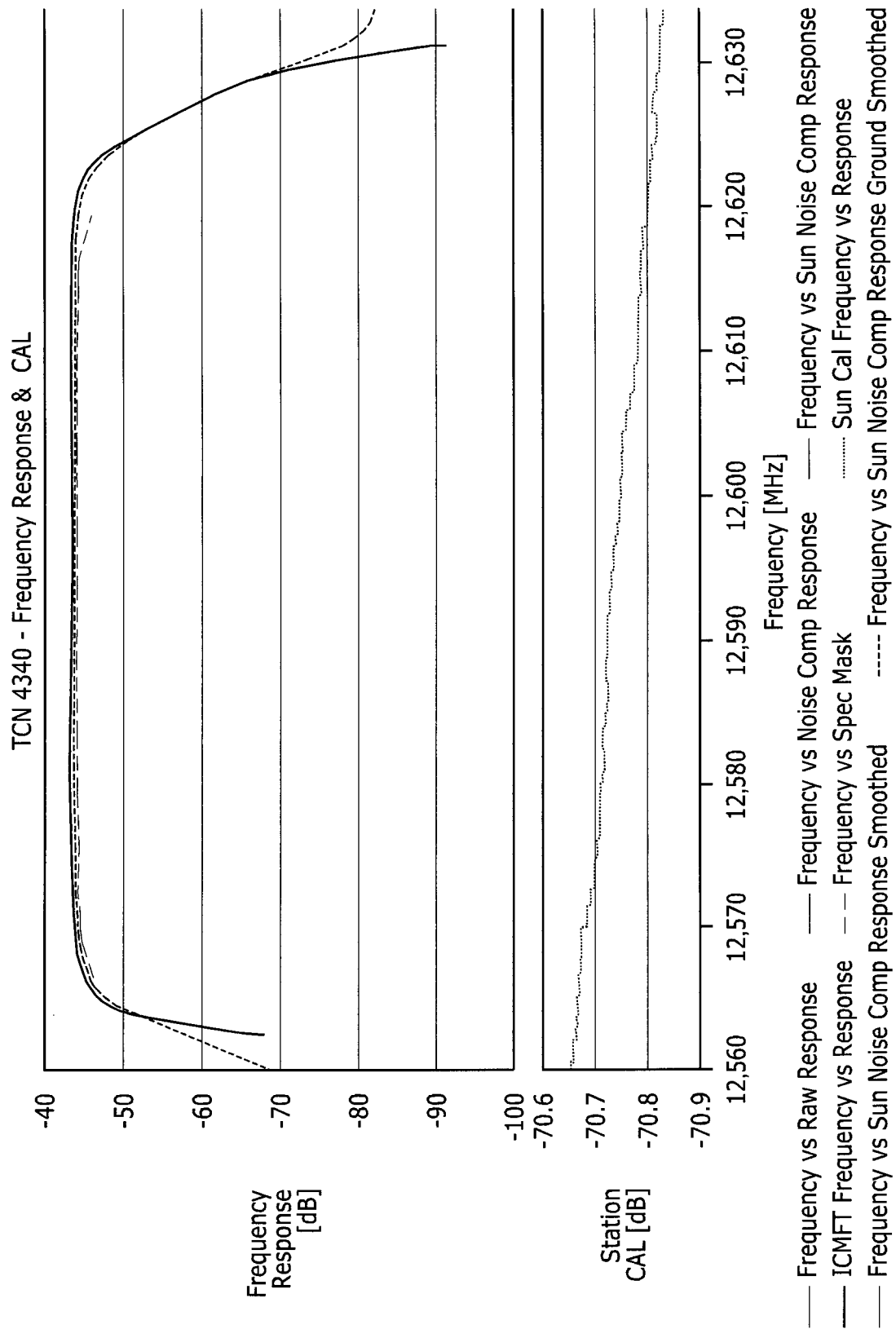
FIG. 17 presents an exemplary plot of channel frequency response obtained during T12V pre-launch testing, including traces for the frequency response mask, noise pedestal response and swept (traditional) response from ground testing.

Data for this measurement can be obtained directly from any of the noise pedestal trace captures. For T12V the noise pedestal trace capture obtained at the ALC maximum gain state was utilized. FIG. 17 is an exemplary plot of channel frequency response obtained during T12V pre-launch testing and includes traces for the frequency response mask, noise pedestal response and swept (traditional) response from ground testing. Following the completion of the in-orbit phase of IOV both the pre-launch and in-orbit phase noise pedestal results were overlaid and compared against the frequency response mask to confirm that the in-orbit measured frequency response had not deviated from the pre-launch measurement.

TWTA Transfer Curve Including EIRP

Figure 18:
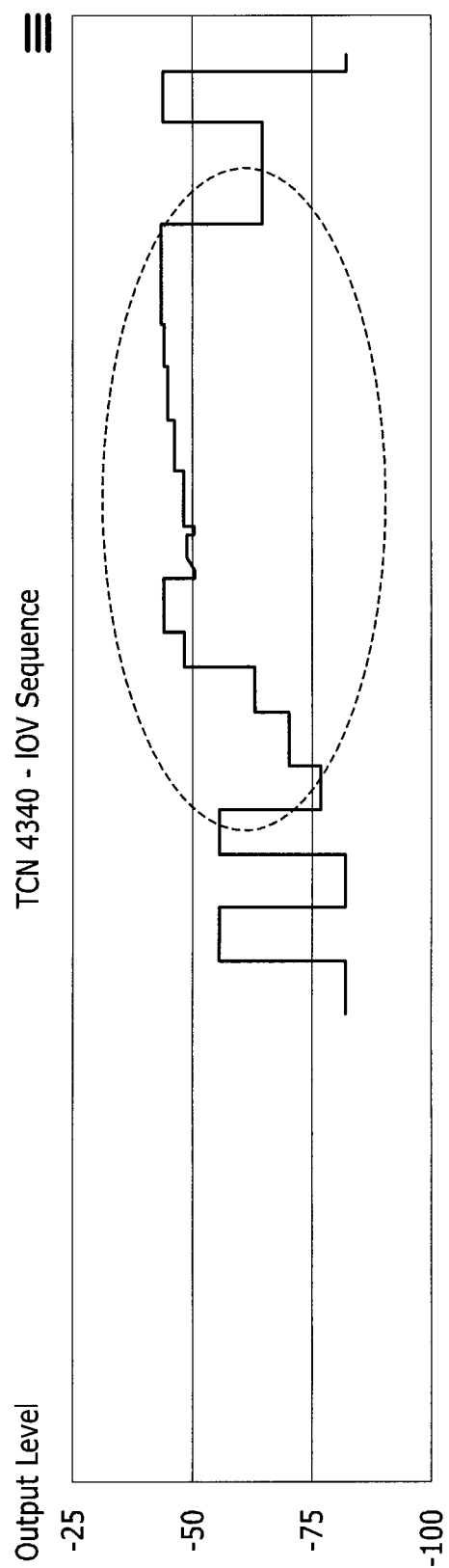
FIG. 18 presents an exemplary TWTA test plot demonstrating that the noise signal drive to the input of the TWTA is increased through the linear range and into the saturation region where the TWTA output becomes flat.

The TWTA transfer curve was produced from the noise pedestal average trace values obtained from the combined response of the fixed gain and ALC step sequence of commands. Within the region covering the fixed gain and ALC mode stepping, as depicted in the top trace in both FIG. 5 and FIG. 13 and, more specifically, as highlighted (in dashed region) within FIG. 18 the noise signal drive to the input of the TWTA is increased through the linear range and into the saturation region where the TWTA output becomes flat. Since the exact same sequences are run during pre-launch and in-orbit the RF step change magnitudes along with telemetry (Ih and Ib) values at each step change can be utilized to evaluate that the TWTA transfer characteristic has not changed since launch. The magnitude of the RF step change, as measured during both IOV phases, should be consistent to with 0.5 dB from step to step. TWTA EIRP was calculated using the sun cal technique as depicted in FIG. 9.

TWTA Fixed Gain and ALC Steps

Figure 19:
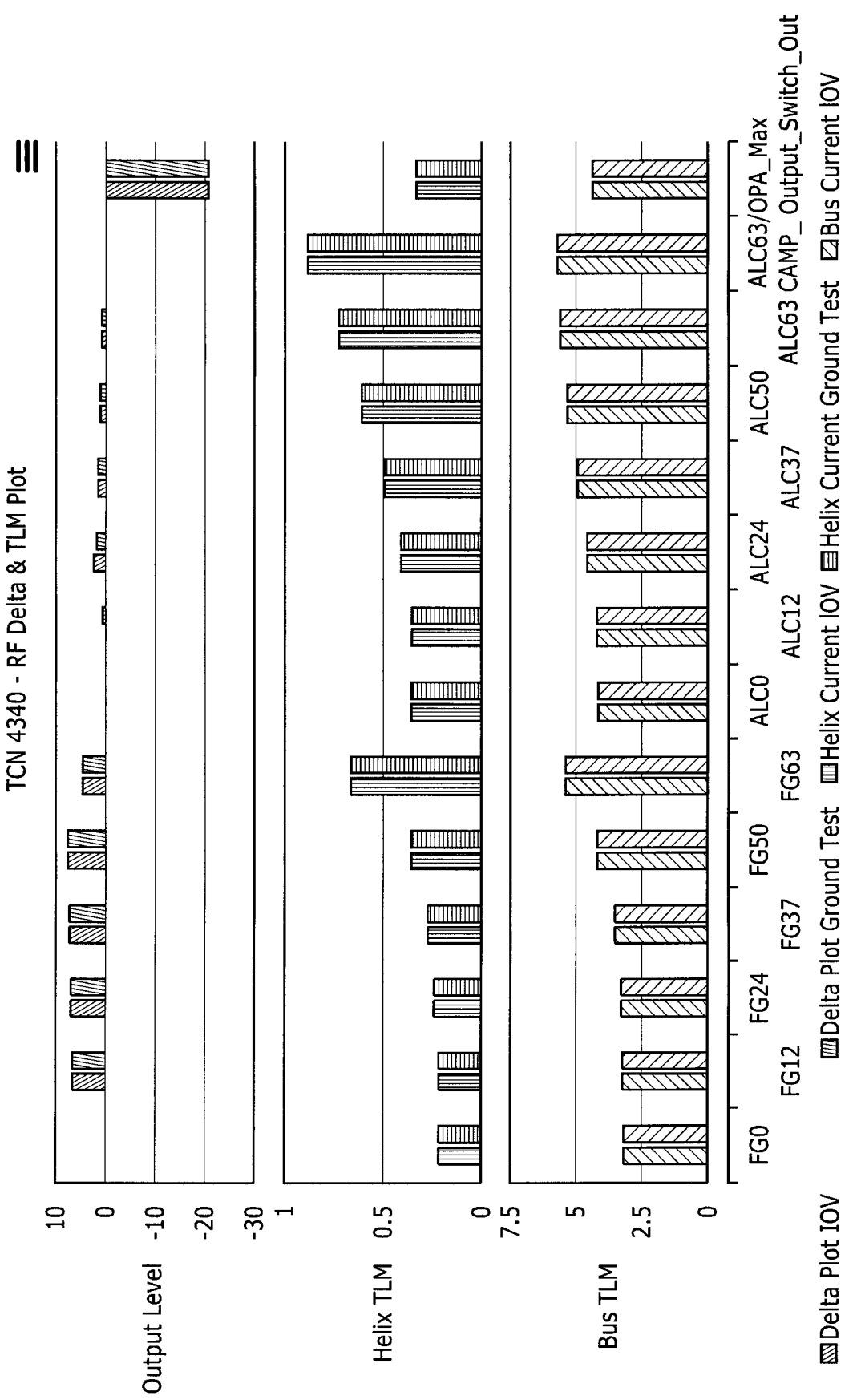
FIG. 19 presents an exemplary bar graph of measured dB change for each gain state transition within the IOV sequence during a TWTA test.

The operation of the channel amplifier attenuators was verified from both a performance and functionality perspective as the pre-defined gain states were commanded for both the Fixed Gain and ALC mode of operation. IOV post processing analysis was used to determine whether the change in RF amplitude for all commanded steps, from both an overall range and individual step perspective, were within a certain dB tolerance (e.g. 0.5 dB) in order to confirm that the in-orbit performance had not deviated appreciably from pre-launch. The top section of FIG. 19 depicts a bar graph of measured dB change for each gain state transition within the IOV sequence.

TWTA Telemetry Calibration

Figure 20:
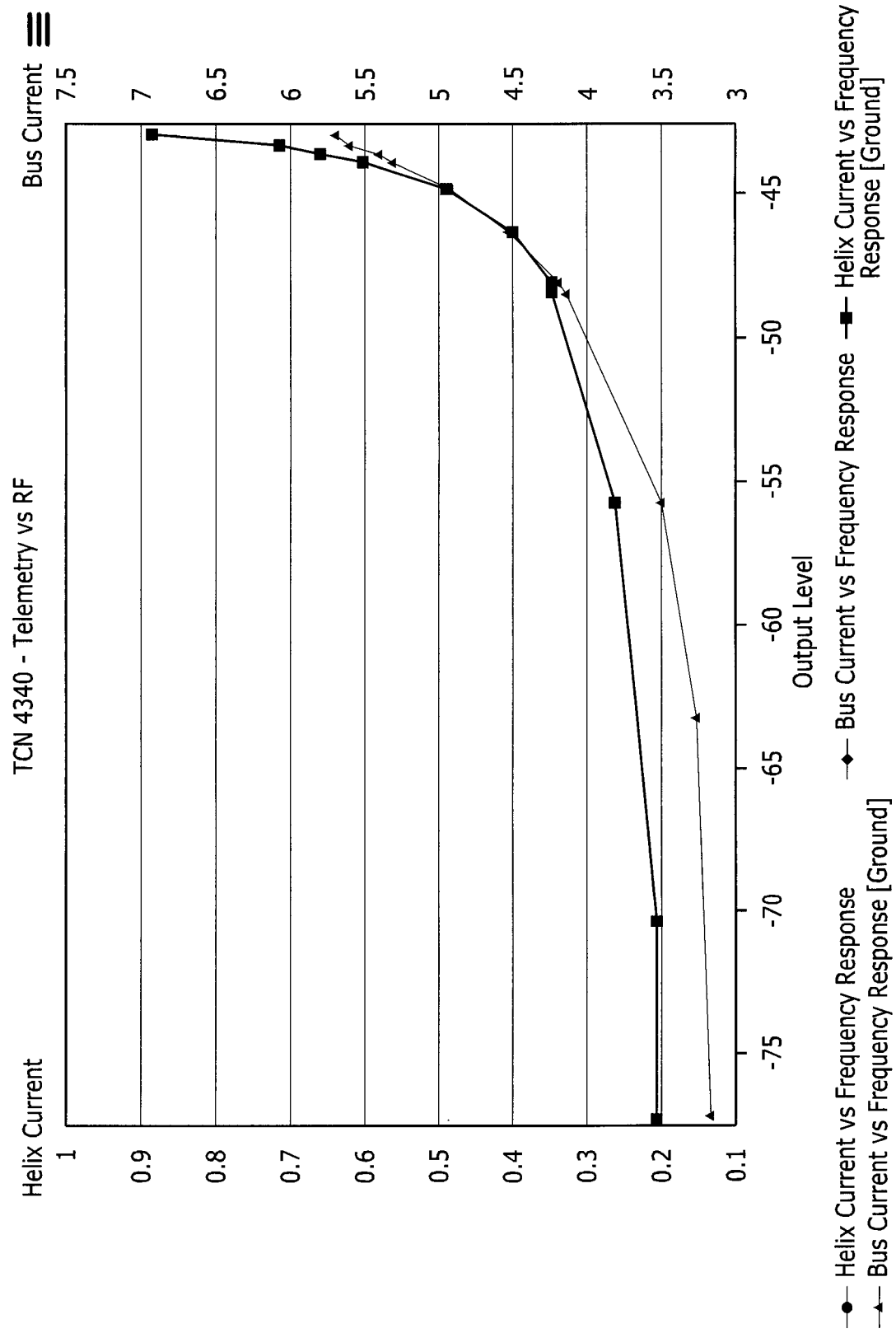
FIG. 20 presents an exemplary graph of TWTA output vs telemetered TWTA helix current (Ih) and TWTA bus current (Ib).

A graph of TWTA output vs telemetered TWTA helix current (Ih) and TWTA bus current (Ib) is depicted in the two curves within FIG. 20. For a properly performing TWTA both curves should overlay, within 1-2 bits, when the pre-launch (ground) results are compared against the in-orbit results. Each curve is derived by the post processing of the average trace capture level plotted against time synchronized telemetry (Ih & Ib) for the TWTA under test.

ALC Control Loop Performance

Figure 21:
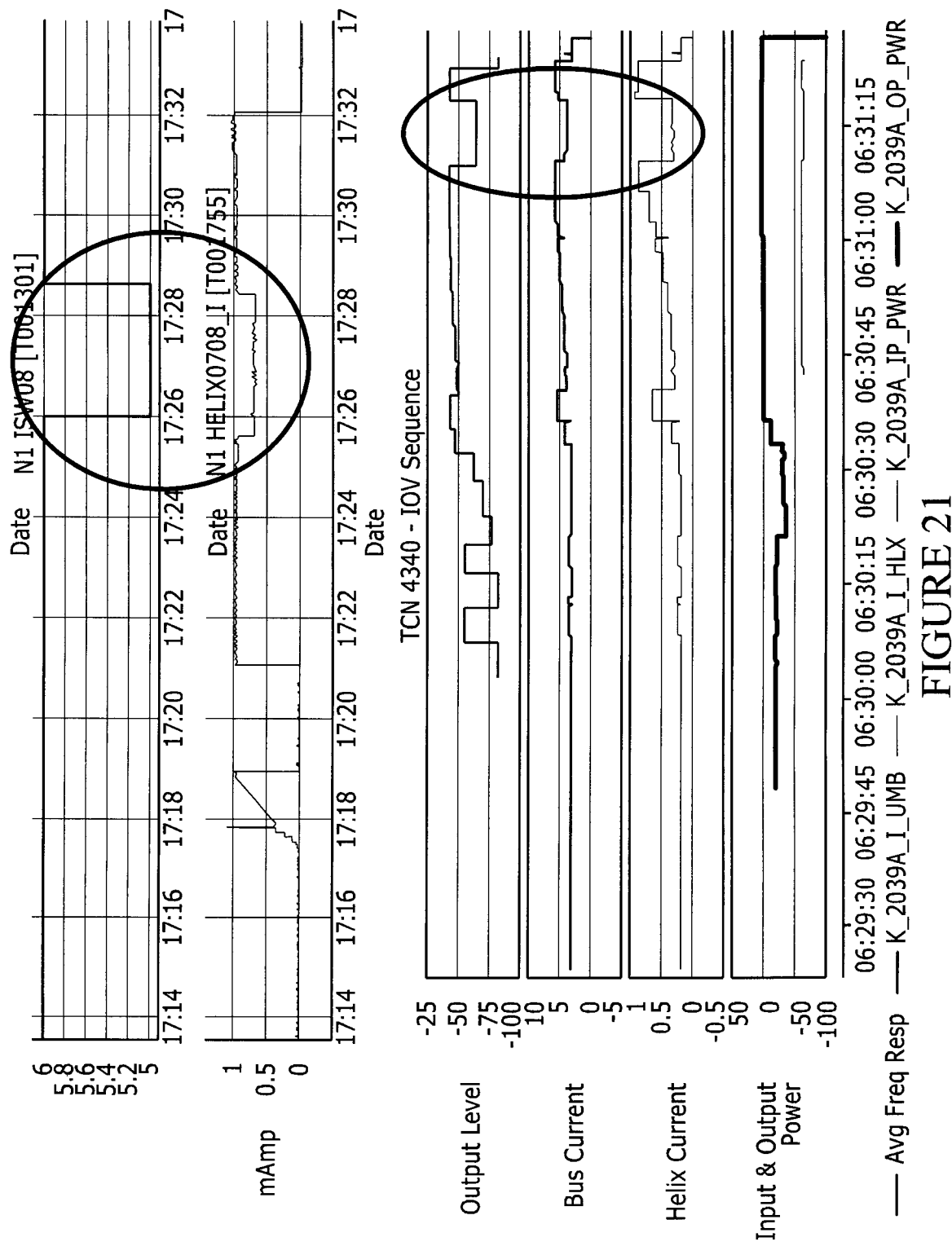
FIG. 21 presents plots from an exemplary ALC Control Loop Performance test.

For IOV the operation of the ALC circuitry is confirmed by switching IN/OUT the noise signal from the on-board receiver that is driving the TWTA. This switch, directly in front of the CAMP, is utilized for this measurement and, at the ALC max gain state, is commanded to a position that removes the noise drive to the TWTA. For properly performing CAMP ALC circuitry, the noise pedestal delta level, measured in-orbit, should match, to within tenths of a dB, the factory pre-launch measured value. More specifically, when the CAMP input is switched out, the ALC loop within the CAMP will maximize the gain in an attempt to hold the output drive to the TWT constant. However the signal level will drop because the ALC loop will have insufficient gain to overcome the 60 dB (approximately) in noise signal level. The corresponding measured drop in power from the TWTA is directly proportional to the increase in ALC loop gain minus the drop in input power. FIG. 21 depicts the results of this measurement performed on both Nimiq 1 (top) and during pre-launch factory tests on T12V (bottom). The area circled in both diagrams highlights when the commands for CAMP switch out were performed.

Receiver Noise Figure

Figure 22B:
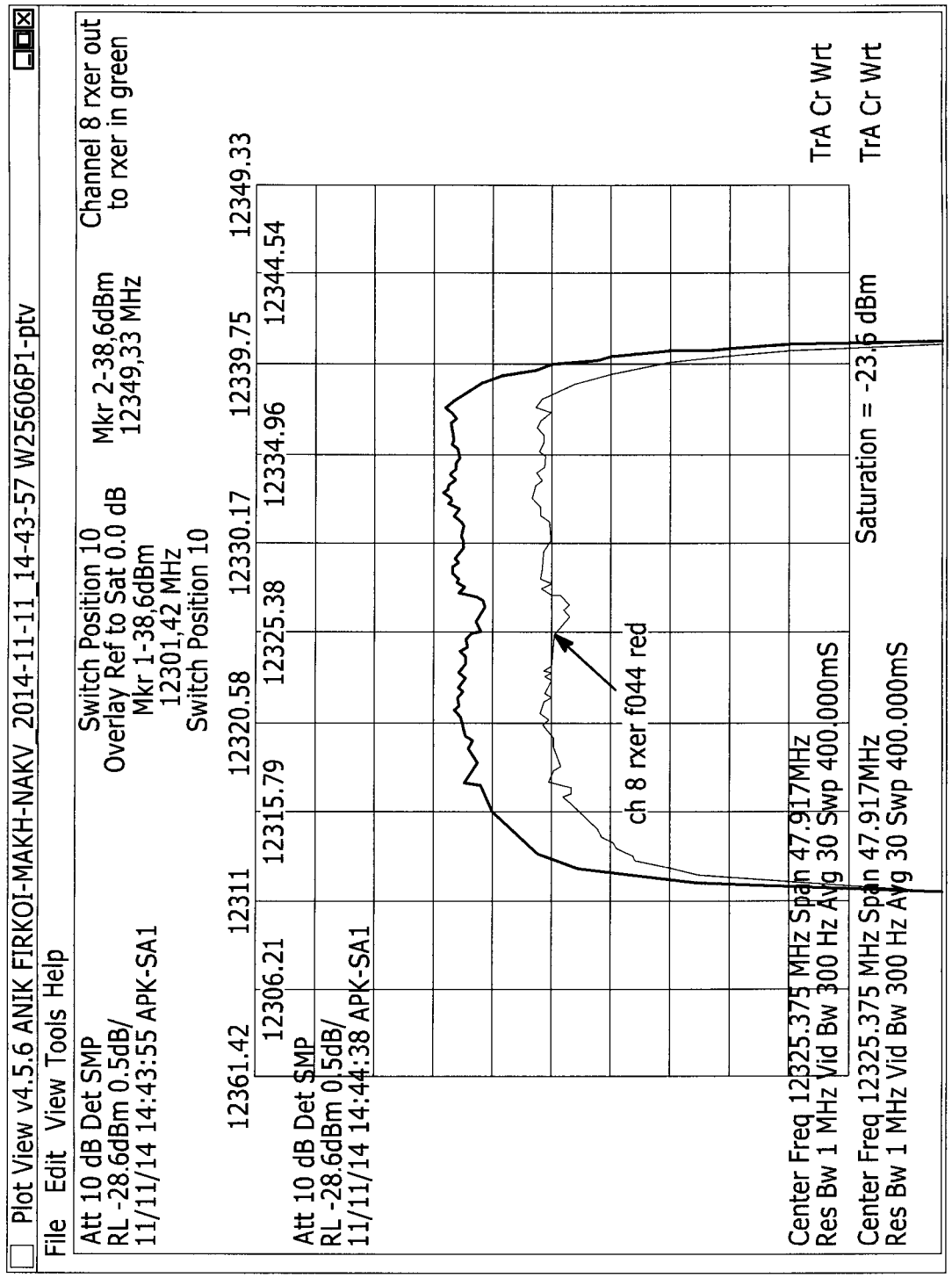

This test is performed by comparing the transmit noise pedestal for any transponder with the receiver input switched to the antenna and then switched to load. The relative change in the peak will be within a pre-determined amount (calculated from $T_{Earth}$ & $T_{load}$). The measured results will provide confirmation of the receiver front-end health. FIG. 22A presents a pictorial diagram of the ESA Ku-band temperature model of the Earth. FIG. 22B presents actual in-orbit measured results for the transmitted noise pedestal signal level change when the Nimiq 1 on-board receiver was switched between the receive antenna port and load. Using the ESA Ku-band temperature model for different areas of the globe, the integrated Earth noise temperature received by Nimiq 1 at the time of the test was estimated to be 240 Kelvin (Tearth). The on-board receiver load temperature of 20 degrees C., was accurately known using temperature telemetry available at the time of the test. This value translates to 293 Kelvin. Since all else is constant (i.e. k & B) within Pn=kTB, the predicted delta power between antenna and load=10 log (293/240)=0.867 dB. The actual change in the transmitted noise pedestal when switching between receive antenna and load for test performed on Nimiq 1 was measured to be approximately 0.8 dB or within 0.07 dB from predicted. The results provided confirmation of the input performance of the Nimiq 1 receiver without the need to use a calibrated RF uplink. For T12V the manufacturer provided the calculated receive integrated noise temperature data for each receive reflector that was utilized during the in-orbit phase of IOV to perform the receiver noise figure test.

Note that for traditional Payload IOT, receiver input performance is characterized by the measurement of SFD (SFD is the Saturated Flux Density; a measure of the input sensitivity of the transponder) and G/T (G/T is the gain-to-noise-temperature ratio; the ratio between the input gain and the noise that is added to the signal). Both measurements have historically provided results that are often skewed (1-2 dB) by one or more influencing factors such as measurement technique, station calibration and weather. In contrast, the described technique, used for IOV, is not impacted by measurement technique, station calibration or weather.

Transmit Antenna Cross-Polarization Performance

The same trace capture used to determine the frequency response at ALC max (see FIG. 17) can be utilized to calculate the transmit antenna cross pol performance of any transponder without the need to perform any additional measurements. Cross-polarization is the polarization orthogonal to the polarization being considered. For instance, if the fields from an antenna are meant to be horizontally polarized, the cross-polarization would be the vertical polarization. If the polarization is Right Hand Circularly Polarized (RHCP), the cross-polarization is Left Hand Circularly Polarized (LHCP). During the in-orbit phase of IOV each receive facility will have a signal analyzer assigned to both antenna receive polarization chains. During the running of each IOV sequence the magnitude of the cross pol noise pedestal component will be recorded at the same time as the co-pol ALC max gain state noise pedestal. The post processing algorithms will then utilize this data to calculate the antenna cross pol performance for each measured channel.

Note that, without an uplink, the receive antenna cross pol cannot be measured. However, since the Telstar 12V antennas use a common Rx/Tx reflector surface and feed horn assembly, one could deduce that a valid transmit cross pol result will provide evidence that the antenna reflector surface and feed horns (minus feed probe assembly) are not mechanically damaged or severely misaligned.

Transmit Antenna Contours

The in-orbit measurement of transmit antenna contours, while performed independently from the IOV, can still benefit greatly by utilizing the IOV concept of isolating the input of the communications receiver by switching to an internal load. The noise pedestal data generated by any on-board active channel (preferable set to the ALC max gain state) can be monitored by the same received ground facilities utilized for IOV to capture the change in noise pedestal transmission levels as the satellite transmit antenna(s) pattern is reoriented (slewed) to predetermined position angles within the transmit antenna coverage regions. The unique on-board receiver configuration ensures against any potential for adjacent satellite or unwanted uplink signals from corrupting the measurement.

Options and Alternatives

In addition to the implementations described above, the system of the invention may be used with any satellite frequency band: L-Band (1-3 GHz); X band (approximately 7-8 GHz); Ku Band (approximately 11-15 GHz), and Ka Band (approximately 17-31 GHz). The system and method of the invention could also be used with any kind of satellite constellation, such as Low Earth Orbit (LEO) or Highly Elliptical Orbits (HEO).

CONCLUSIONS

One or more currently preferred embodiments have been described by way of example. It will be apparent to persons skilled in the art that a number of variations and modifications can be made without departing from the scope of the invention as defined in the claims.

All citations are hereby incorporated by reference.

What is claimed is:

1. A method of satellite in-orbit payload verification comprising:
    prior to launch of the satellite:
        configuring the operating parameters of a communication payload of the satellite to a specific state, said state including a payload input being configured to an RF termination or off-line, resulting in a thermal noise signal being self-generated by the payload; and
        processing the thermal noise signal to generate a baseline data set;
    following launch of the satellite, at the satellite:
        configuring operating parameters of the payload to the same specific state, resulting in an in-orbit thermal noise signal being self-generated by the payload of the satellite; and
        processing and transmitting said in-orbit thermal noise signal from the satellite to a ground station;
    at the ground station:
        receiving the transmitted in-orbit thermal noise signal; and
        comparing the received in-orbit thermal noise signal to the baseline data set for the same payload state, to determine whether performance and functionality of the communication payload has changed.

2. The method of claim 1 wherein said step of comparing comprises quantifying the degree of change between the received in-orbit thermal noise signal and the baseline data set.

3. The method of claim 2 wherein said step of comparing comprises determining whether the degree of change between the received in-orbit thermal noise signal and the baseline data set has exceeded a threshold value.

4. The method of claim 1, wherein analysis of the received in-orbit thermal noise signal and the baseline data set are performed using data obtained from a signal analyser, or an equivalent device.

5. The method of claim 1, wherein the input to the communication payload is isolated by being switched to a non-conventional mode, with a receiver input switched to an off-line position to isolate the input of the payload from external sources and to allow the use of the unaltered, internally generated, thermal noise.

6. The method of claim 5, wherein the off-line position comprises a connection to a passive load, a matched load or a termination.

7. The method of claim 1, wherein the payload of the satellite is provided with a thermally-controlled environment, whereby the thermal noise signal will be stable.

8. The method of claim 1, further comprising the step of calibrating the ground station using the Sun as a noise reference.

9. The method of claim 8, further comprising the step of the ground station subtracting Sun noise variation from the received satellite signal.

10. The method of claim 1, further comprising the step of compensating for the effects of atmospheric radio frequency attenuation and scintillation of the received satellite noise signal by using the Sun as a noise reference.

11. The method of claim 1, further comprising the step of determining the power level of the received satellite noise signal by transference of a known reference radio frequency signal source utilizing the Sun noise as an intermediary reference.

12. The method of claim 1, wherein the thermal noise signal comprises a noise pedestal or series of noise pedestals.

13. The method of claim 1, further comprising the step of saving the in-orbit data set and the baseline data set for post-processing and analysis.

14. The method of claim 1, wherein the analysis of the in-orbit data set and the baseline data set comprises at least one of the performance measures from the list comprising:
    Transponder Frequency Response;
    Transponder output power, EIRP;
    Amplifier transfer curve and linearity Amplifier Fixed Gain and ALC Gain Steps;
    Amplifier Telemetry Calibration and Response;
    ALC Control Loop Performance;
    Receive Noise Figure; and
    Transmit Antenna Cross Polarization Performance.

15. The method of claim 1, wherein the baseline data set comprises RF output data and payload telemetry data.

16. The method of claim 1, wherein the in-orbit data set comprises RF output data and payload telemetry data.

17. The method of claim 1, wherein the payload comprises a communication payload.

18. The method of claim 17, wherein the payload input comprises an input to one channel of the communication payload.

19. The method of claim 17, wherein the payload input comprises inputs to multiple channels, simultaneously, of the communication payload.

20. The method of claim 1, wherein the specific state comprises a series of states stepped through via a predefined repeater command sequence.

21. The method of claim 1, wherein the processed thermal noise signal transmitted by the payload comprises a hardware-specific signature.

22. A satellite system comprising:
    a satellite having a communication payload; and
    a ground station;
    the satellite being operable to:
    prior to launch of the satellite:
        configure the operating parameters of the communication payload to a specific state, said specific state including a payload input being configured to an RF termination or off-line, resulting in a thermal noise signal being self-generated by the payload of the satellite; and
        process the thermal noise signal to generate a baseline data set; and
    while the satellite is in orbit:
        configure the operating parameters of the payload to the same specific state, resulting in an in-orbit thermal noise signal being self-generated by the payload of the satellite; and
        process and transmit said in-orbit thermal noise signal from the satellite to the ground station;
    the ground station being operable to:
        receive the transmitted in-orbit thermal noise signal; and compare the received in-orbit thermal noise signal to the baseline data set for the same payload state, to determine whether performance and functionality of the communication payload has changed.

\* \* \* \* \*